(12) United States Patent
Andersson et al.

(10) Patent No.: US 10,766,075 B2
(45) Date of Patent: Sep. 8, 2020

(54) METAL CUTTING GROOVING INSERT FOR FACE GROOVING

(71) Applicant: SANDVIK INTELLECTUAL PROPERTY AB, Sandviken (SE)

(72) Inventors: Claes Andersson, Valbo (SE); Gunnar Jansson, Sandviken (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 0 days.

(21) Appl. No.: 16/093,078

(22) PCT Filed: Mar. 8, 2017

(86) PCT No.: PCT/EP2017/055451
§ 371 (c)(1),
(2) Date: Oct. 11, 2018

(87) PCT Pub. No.: WO2017/178155
PCT Pub. Date: Oct. 19, 2017

(65) Prior Publication Data
US 2019/0176238 A1    Jun. 13, 2019

(30) Foreign Application Priority Data
Apr. 14, 2016   (EP) .................... 16165314

(51) Int. Cl.
*B23B 27/04* (2006.01)
*B23B 27/22* (2006.01)
(Continued)

(52) U.S. Cl.
CPC .............. *B23B 27/08* (2013.01); *B23B 27/04* (2013.01); *B23B 29/043* (2013.01); *B23B 29/06* (2013.01);
(Continued)

(58) Field of Classification Search
CPC . B23B 2205/04; B23B 27/10; B23B 2250/12; B23B 2200/0423;
(Continued)

(56) References Cited

U.S. PATENT DOCUMENTS 5,516,241 A * 5/1996 Plutschuck ............. B23B 27/04
                                                        407/110
5,975,812 A * 11/1999 Friedman ............... B23B 27/045
                                                        407/113
(Continued)

FOREIGN PATENT DOCUMENTS

DE       29804257 U1    5/1998
DE   102014102019 A1    8/2015
(Continued)

*Primary Examiner* — Sara Addisu
(74) *Attorney, Agent, or Firm* — Corinne R. Gorski

(57) ABSTRACT

A grooving insert includes a front surface and an opposite rear surface, a first side surface and an opposite second side surface, and a top surface and an opposite bottom surface. The top surface includes a top front portion and a top rear portion, the top front portion having a cutting edge arranged symmetrically relative to a first plane. The bottom surface is symmetrically arranged in relation to a second plane, the first plane and the second plane forming an angle (α) of 0.5-5.0° relative to each other.

15 Claims, 13 Drawing Sheets

(51) Int. Cl.
*B23B 29/04* (2006.01)
*B23B 27/08* (2006.01)
*B23B 29/06* (2006.01)

(52) U.S. Cl.
CPC ... *B23B 2200/0423* (2013.01); *B23B 2205/02* (2013.01); *B23B 2220/126* (2013.01)

(58) Field of Classification Search
CPC ... B23B 2205/02; B23B 27/04; B23B 29/043; B23B 29/06; B23B 27/045; B23B 2200/163; B23B 2200/167; B23B 2200/165; Y10T 407/23; Y10T 407/25
See application file for complete search history.

(56) References Cited

U.S. PATENT DOCUMENTS

| | | |
|---|---|---|
| 9,259,788 B2 * | 2/2016 | Malka ................... B23B 27/086 |
| 2011/0158756 A1 | 6/2011 | Shimon |

FOREIGN PATENT DOCUMENTS

| | | |
|---|---|---|
| EP | 0416854 A1 | 3/1991 |
| JP | 2013-166189 A | 8/2013 |
| WO | 2015099369 A1 | 7/2015 |

* cited by examiner

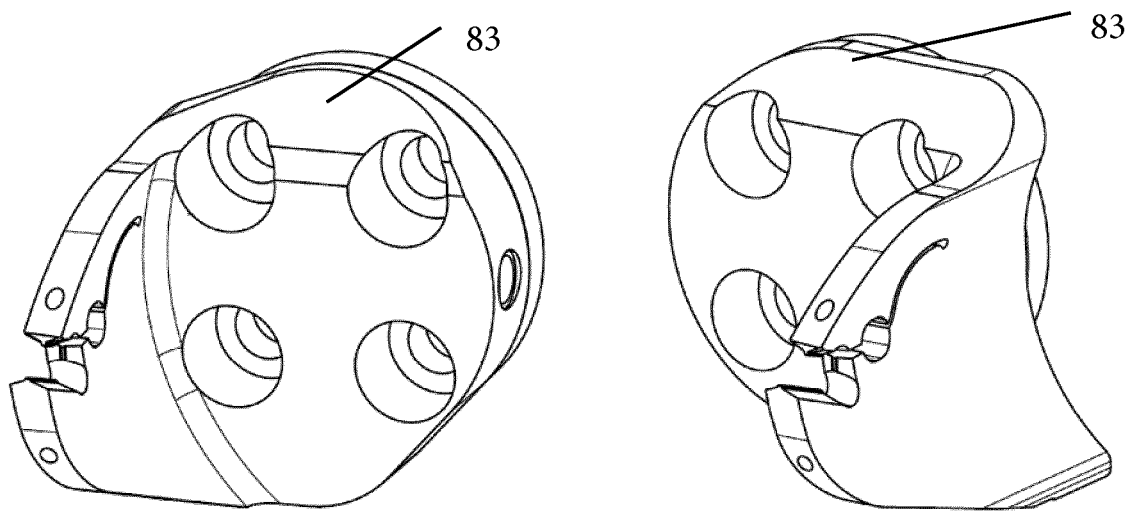
Fig. 11
Fig. 12
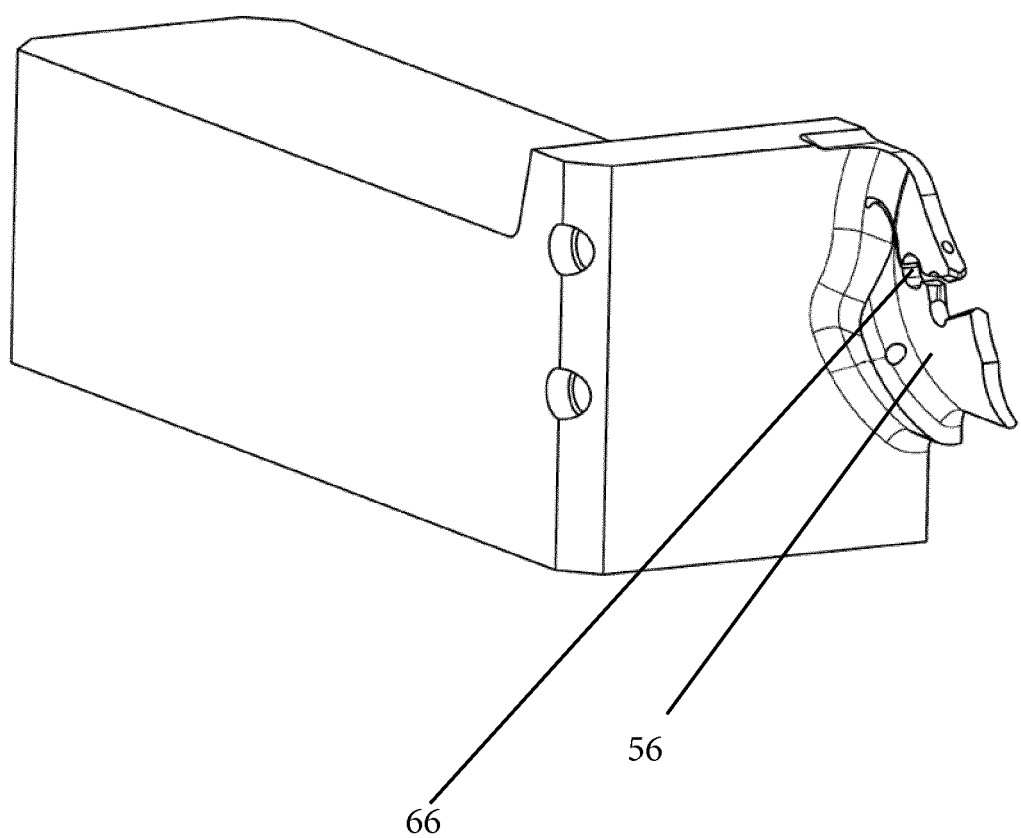
Fig. 13

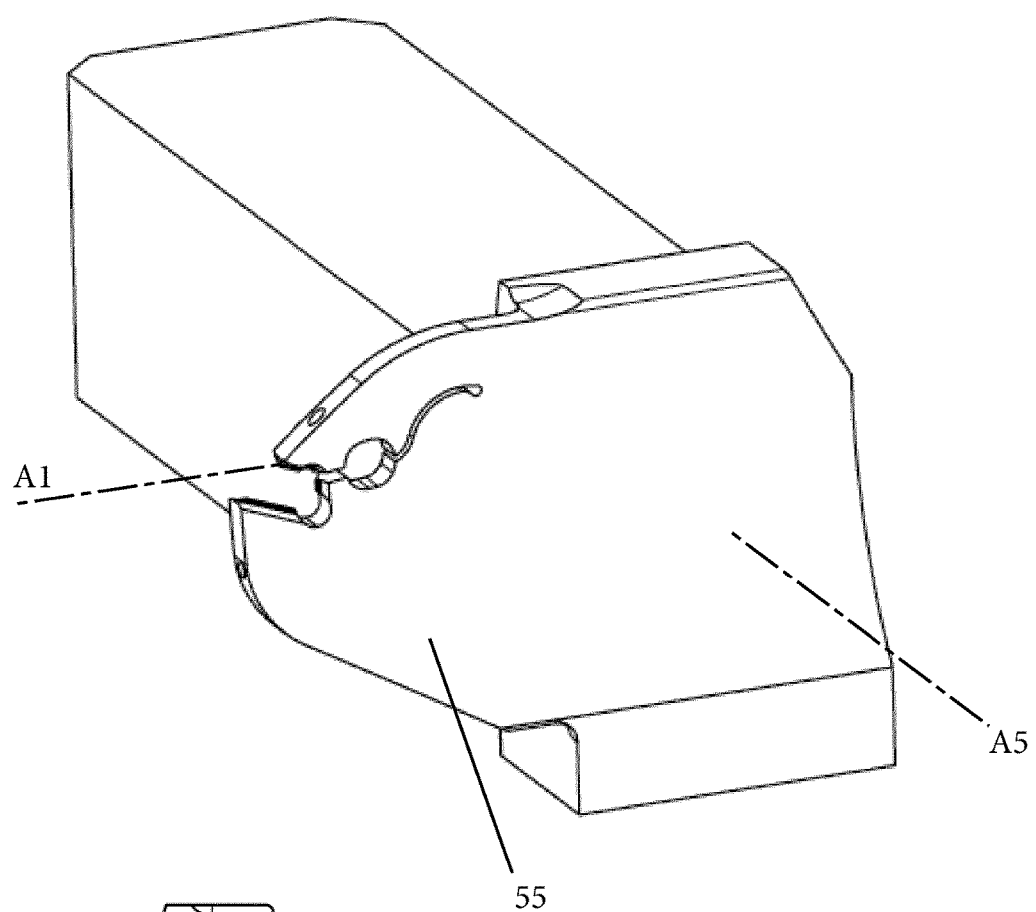
Fig. 14
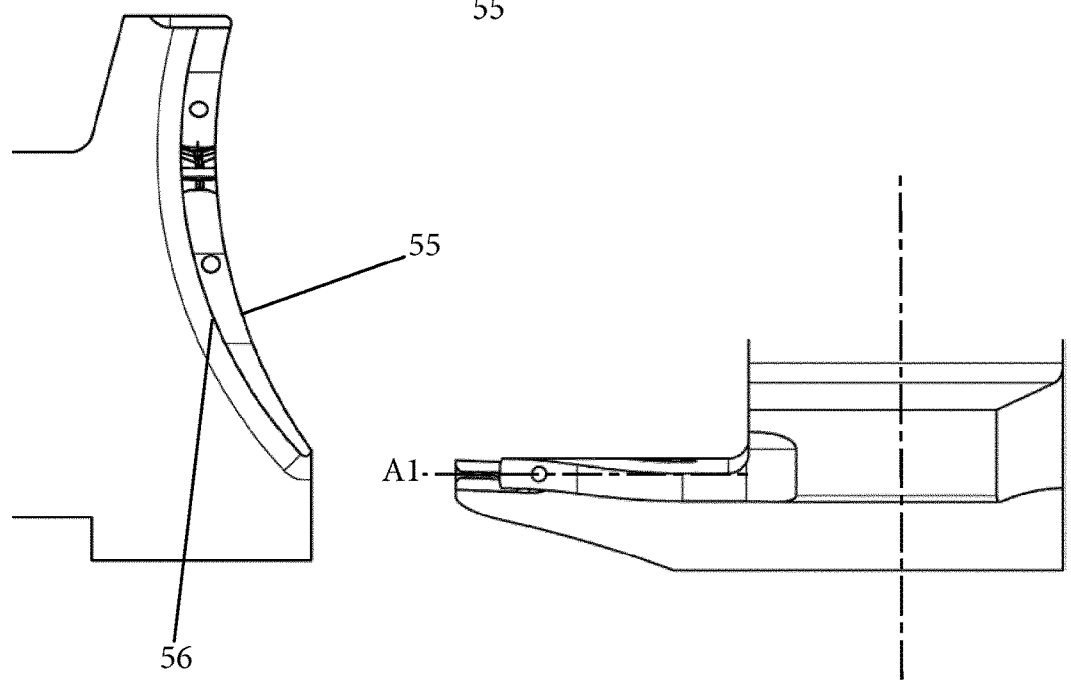
Fig. 15
Fig. 16

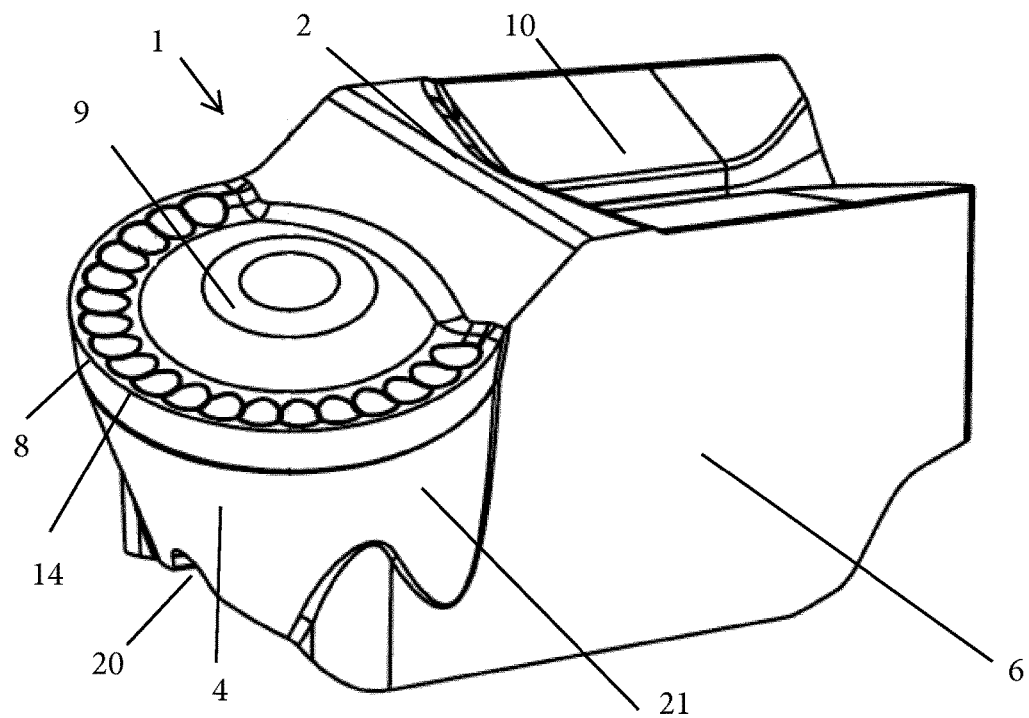
Fig. 24
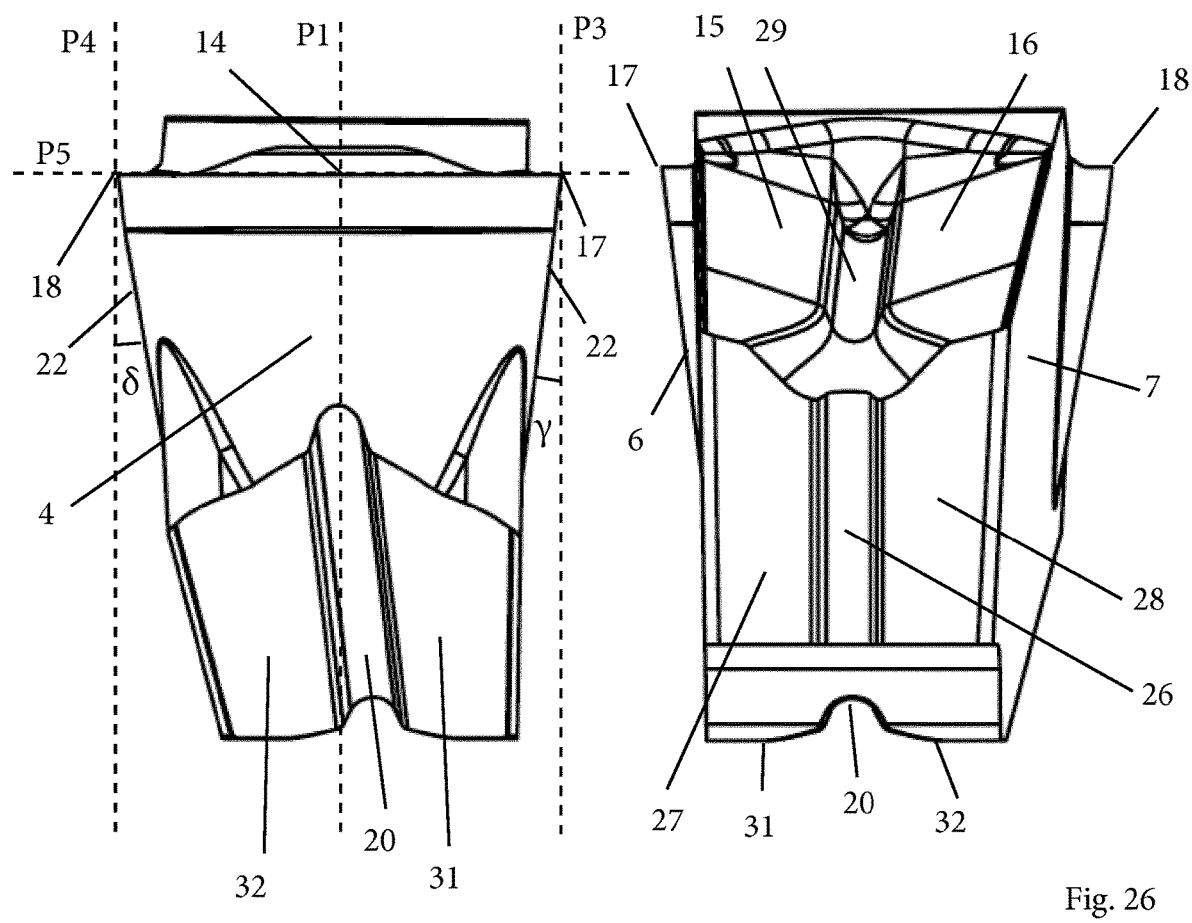
Fig. 25
Fig. 26

METAL CUTTING GROOVING INSERT FOR FACE GROOVING

RELATED APPLICATION DATA

This application is a § 371 National Stage Application of PCT International Application No. PCT/EP2017/055451 filed Mar. 8, 2017 claiming priority to EP 16165314.2 filed Apr. 14, 2016.

TECHNICAL FIELD OF THE INVENTION

The present invention belongs to the technical field of metal cutting. More specifically the present invention belongs to the field of grooving inserts for face grooving used for metal cutting in machines such as computer numerical control, i.e. CNC, machines.

BACKGROUND OF THE INVENTION AND PRIOR ART

The present invention refers to a grooving insert, more specifically a face grooving insert, according to the preamble of claim 1. In other words, the present invention refers to a grooving insert comprising a front surface and an opposite rear surface, a first side surface and an opposite second side surface, a top surface and an opposite bottom surface. The top surface comprising a top front portion and a top rear portion, the top front portion comprising a rake face and a cutting edge. The cutting edge is at least partly formed in an intersection between the rake face and the front surface. The cutting edge extends continuously or substantially continuously between a first end point and a second end point. The cutting edge is arranged symmetrically or substantially symmetrically relative to a first plane. The first plane intersects a mid-point of the cutting edge and intersects the rear surface. The top rear portion comprising a top support surface. The bottom surface comprising a bottom support surface. The bottom surface is symmetrically or substantially symmetrically arranged in relation to a second plane. The second plane intersects the front surface and the rear surface.

Such a grooving insert is known from JP 2013-166189 A.

A face grooving insert can be used to produce, by metal cutting, a circular groove in a rotating metal work piece. The circular groove produced has a center which coincides with a rotational axis of the metal work piece. A primary cutting feed direction of the face grooving tool body is parallel to the rotational axis of the metal work piece.

During use, the face grooving insert is mounted in an insert seat of a face grooving tool body.

For circular grooves having a depth which is greater than the length of the face grooving insert, the face grooving tool body has a shape which allows face grooving in a primary feed direction, parallel to a rotation axis of a metal work piece, without interference or damage. This is normally achieved by providing the face grooving tool body with a blade portion which is curved around one or more axes of curvature, which axes are parallel to the primary feed direction.

For narrow and deep circular grooves, it is advantageous with a clamping mechanism of the grooving insert which works according to the principle that the insert seat can be opened by a movement, such as a rotation, of a key, which forces an upper and lower clamping jaw away from each other. When the key is not present, the insert is clamped by the upper and lower clamping jaws. The upper clamping jaw is therefore elastically deformable, or resiliently moveable. Such a clamping mechanism is known as spring clamping.

Alternatively, a so called screw clamping mechanism can be used. In such a face grooving tool body, a clamping screw is rotated which forces an upper clamping jaw against an upper clamping surface of a face grooving insert. Such a mechanism is less effective for deep grooves, because as the distance from the clamping screw to the active cutting edge is increased, the necessary torque for the clamping screw in order to achieve sufficient insert clamping is increased.

The face grooving insert known from JP 2013-166189 comprises a top surface comprising a top clamping surface which is V-shaped in cross section. A central groove extends symmetrically to a longitudinal axis of the insert, separating two equally large surfaces. The bottom surface comprises a bottom support surface arranged in a corresponding manner. The top clamping surface and the bottom support surface of the face grooving insert corresponds to a shape of the insert seat of the face grooving tool body, in which the face grooving insert is mounted. The face grooving insert is mounted horizontally in the insert seat in side view, i.e. such that the top and bottom surfaces extend parallel to a primary cutting feed direction.

SUMMARY OF THE INVENTION

The inventors have found that horizontal mounting of a face grooving insert requires a high clamping force in order to avoid that the face grooving insert is pulled out of the insert seat during retraction after cutting a circular groove. The inventors have found that lower clamping force is advantageous in order to increase the service life of the face grooving tool body. The inventors have found that for a face grooving insert during use, the risk of interference or contact between a non-cutting part of the insert, especially the rear end of the bottom surface, and the side walls of the machined grooves, is relatively high for one side of the rear end of the bottom surface and relatively low for one opposite side of the rear end of the bottom surface.

An object of the present invention is to provide a grooving insert which can be used such that only a reduced clamping force is required, and which grooving insert is useable in a face grooving operation.

A further object of the invention is to provide a grooving insert which has reduced risk of interference of non-cutting parts of the insert during face grooving.

At least one of the objects is achieved with the initially defined grooving insert, which is characterized in that the first plane and the second plane forms an angle of 0.5-5.0° relative to each other.

By arranging the bottom surface at an angle relative to the cutting edge, the bottom support surface can be made sufficiently large even if the insert is positioned in a downward sloping manner in a side view, thereby improving the stability of the grooving insert in the insert seat.

By arranging the bottom surface at an angle relative to the cutting edge, clearance is improved. More specifically, the risk of part of the bottom surface adjacent to the second side surface being in contact with a radially outer side wall of a circular groove, i.e. face groove, is reduced.

By arranging the bottom surface, and also the bottom support surface, symmetrically or substantially symmetrically in relation to the second plane, the stability of the insert in the insert seat is improved.

A grooving insert is suitable for metal cutting, and made from a wear resistant material, preferably comprising cemented carbide. The grooving insert is suitable for forming a circular groove in a turning operation, i.e. suitable for face grooving.

The grooving insert comprises a front surface, i.e. a front end surface, comprising a primary clearance surface, and an opposite rear surface, i.e. a rear end surface, wherein at least a portion of the rear surface is suitable for being in contact with a rear support surface in an insert seat of a face grooving tool body.

The front surface is facing a primary cutting feed direction of the grooving insert.

The grooving insert comprises a first side surface and an opposite second side surface.

The grooving insert comprises a top surface and an opposite bottom surface. The top surface comprising a top front portion and a top rear portion. The top front portion and the top rear portion are preferably separated by a ridge or one or more protrusions, extending from the first side surface to the second side surface. A distance from the bottom surface to the ridge or one or more protrusions is preferably greater than a distance from the bottom surface to the top front portion or to the top rear portion, respectively.

The top front portion comprises a rake face and preferably a chip forming surface. The top front portion comprising a cutting edge at least partly formed in an intersection between the rake face and the front surface, extending continuously or substantially continuously between a first end point, preferably located at an intersection between the first side surface and the rake face, and a second end point, preferably located at an intersection between the second side surface and the rake face.

The cutting edge being arranged symmetrically or substantially symmetrically relative to a first plane, which first plane intersects a mid-point of the cutting edge and intersects the rear surface.

The mid-point of the cutting edge is a point which during use is mid-way between side wall surfaces of a circular groove formed by the grooving insert.

Preferably, the top front portion is arranged symmetrically or substantially symmetrically relative to the first plane, in a top view. The first plane coincides with a primary cutting feed direction of the grooving insert.

The top rear portion comprises a top support surface, suitable to being in contact with an upper clamping surface in an insert seat of a face grooving tool body.

The bottom surface comprises a bottom support surface, suitable to being in contact with a bottom support surface in an insert seat of a face grooving tool body.

The bottom surface is symmetrically or substantially symmetrically arranged in relation to a second plane.

The bottom surface preferably comprises a central structure, preferably a groove or a ridge, extending along a line which is part of, or located in, the second plane. The central structure preferably extends between opposite ends of the bottom surface.

The second plane intersects the front surface and the rear surface. The first plane and the second plane form an angle α of 0.5-5.0° relative to each other in a top view. A line formed at an intersection between the first plane and the second plane extends in a direction perpendicular to a primary cutting feed direction of the grooving insert.

The reference plane preferably intersects the top support surface. The grooving insert is shaped such that during a face grooving operation, when the grooving insert is moved in a primary cutting feed direction, the only portion of the grooving insert which is in contact with the side wall surfaces of the circular grooved formed is the cutting edge. More precisely, only first and second distal edge portions of the cutting edge. All other portions of the grooving insert are located between the side wall surfaces, formed by the first and second distal edge portions of the cutting edge. In other words, the grooving insert is positionable such that in face grooving, a grooving depth deeper than the length of the grooving insert, defined by the distance from the front surface to the rear surface, is possible where the width of the groove is defined by the cutting edge.

According to an aspect of the invention, a distance from the bottom surface to a reference plane, is increasing away from the front surface towards the rear surface, where at least 50% of the cutting edge, the first end point and the second end point are located in the reference plane, and wherein the reference plane P5 is perpendicular to the first plane P1.

Such a grooving insert especially suitable to be positionable such that the rear end is lower than the front end in a side view, thereby reducing the necessary clamping force to hold the insert in an insert seat.

The inventors have found that a non-horizontal position, more specifically a position where a rear end is lower than a front end, i.e. a rearward downward sloping position in a side view, of a face grooving insert reduces the required clamping force. The inventors have realized that achieving sufficient clearance is important, if the face grooving insert is positioned in a non-horizontal manner.

The reference plane comprises the first end point and the second end point. The reference plane comprises a primary cutting feed direction of the grooving insert.

A distance from the bottom surface to a reference plane is increasing away from the front surface towards the rear surface, preferably linearly. The bottom surface and the reference plane preferably form an angle 5-45°, even more preferably 10-30°, in a side view. A plane comprising the bottom surface, or an extension of the bottom surface, intersect the reference plane at an intersection point forward of the front surface. In other words, the front surface faces the intersection point.

At least 50%, preferably 60-100%, of the cutting edge is located in the reference plane.

The reference plane is perpendicular to the first plane.

According to an aspect of the invention, the cutting edge comprises a first distal edge portion, adjacent to the first side surface, and a second distal edge portion, adjacent to the second side surface, wherein the first and second distal edge portions are the most distal portions of the cutting edge in relation to the first plane, wherein a third plane, parallel to the first plane, intersects the first distal edge portion, and wherein a fourth plane, parallel to the first plane, intersects the second distal edge portion, wherein a distance from the fourth plane to the bottom support surface is increasing towards the rear surface.

By such a grooving insert, the risk the second side surface having contact with an outer wall surface in a face grooving operation is reduced if the insert is positioned such that the bottom surface is tilted downwards in a rearward direction, seen in a side view.

A distance between the first and second distal edge portions define a width of a groove cut by the grooving insert when moved in a primary cutting feed direction.

Preferably, first and second distal edge portions are located on convex portions of the cutting edge, in a top view.

The first and second distal edge portions are located in the reference plane.

A mid-point of the cutting edge is located between and at equal distances from the third and fourth planes.

Except for the second distal edge portion, which intersects the fourth plane, all parts of the grooving insert is located on one side of, and spaced apart from, the fourth plane.

According to an aspect of the invention, the bottom surface comprises a first groove symmetrically arranged in relation to the second plane and extending from the front surface to the rear surface.

By such a grooving insert, the stability of the grooving insert in an insert seat is improved, especially if the bottom support surface of the insert seat comprises a central ridge.

By such a grooving insert, mounting of the insert can be made more easily, because the insert can be pressed towards a rear support surface in the insert seat in a linear manner.

The first groove is a central groove, or depression, which is spaced apart from first and second side surfaces.

The first groove is straight in bottom view.

The first groove preferably has a constant width and a constant shape in a cross section.

According to an aspect of the invention, the first side surface comprises a first clearance surface adjacent to a first portion of the cutting edge, wherein the first clearance surface forms a first clearance angle in relation to the third plane, wherein the second side surface comprises a second clearance surface adjacent to a second portion of the cutting edge, wherein the second clearance surface forms a second clearance angle in relation to the third plane, wherein the second clearance angle is larger than the first clearance angle.

By such a grooving insert, the grooving insert is more suitable for face grooving. More specifically, the first clearance angle, for the first clearance surface, is relatively small which give an increased strength of second portion of the cutting edge.

The second clearance angle, for the second clearance surface, is relatively great which allows for machining of smaller diameters of circular grooves. During use, in a face grooving operation, the first clearance surface is facing an inner wall surface of the circular groove, and the second clearance surface is facing an outer wall surface of the circular groove.

The first clearance angle is preferable 1-10°. The second clearance angle is preferably 3-20°.

The first portion and the second portion of the cutting edge preferably converge rearward of the front surface.

The first portion and the second portion of the cutting edge are preferably straight or linear in a top view. Alternatively, the first portion and the second portion of the cutting edge may be convexly curved in a top view.

The first portion and the second portion of the cutting edge are preferably located entirely in the reference plane.

According to an aspect of the invention, the first side surface comprises a first clearance surface adjacent to a first portion of the cutting edge, wherein the second side surface comprises a second clearance surface adjacent to a second portion of the cutting edge, wherein lower boundary lines of each of the first and second clearance surfaces and the bottom surface are spaced apart, wherein an area of the second clearance surface is greater than an area of the first clearance surface.

In other words, the clearance surface is located at a distance from the bottom surface, and the second clearance surface is located at a distance from the bottom surface.

By such a grooving insert when used in a face grooving operation, the strength of second portion of the cutting edge is further improved, and the possibility for machining of smaller diameters of circular grooves is further improved.

The first and second clearance surfaces are thus distinctly limited by upper boundary lines, defined by the first and second portions of the cutting edge respectively, and by lower boundary lines. The lower boundary lines are spaced apart from the bottom surface.

An area of the second clearance surface, in a side view, is greater than an area of the first clearance surface, in a side view, which is a consequence of that a distance from a rear bottom end of the first clearance surface to the bottom surface is greater than a distance from a rear bottom end of the second clearance surface to the bottom surface.

According to an aspect of the invention, a width of the bottom surface, perpendicular to the second plane, is decreasing away from the front surface.

By such a grooving insert, the bottom surface and the bottom support surface can be relatively great in width near or adjacent to the front surface in order to increase the strength and support near the active cutting edge, while the bottom support surface can be made relatively small in width near or adjacent to the rear surface, thereby providing increased clearance.

A width of the bottom surface, in a bottom view, measured perpendicular to the second plane, e.g. perpendicular to the central ridge formed in the bottom surface, is decreasing away from the front surface towards the rear surface.

According to an aspect of the invention, the rear surface comprises a first rear support surface adjacent to the first side surface and a second rear support surface adjacent to the second side surface, and a second groove extending from the top surface towards the bottom surface and extending between the first rear support surface and the second rear support surface.

By such a grooving insert, the stability of the grooving insert in the insert seat is further improved.

Preferably, an area of the first rear support surface is smaller than an area of the second rear support surface.

Preferably, the first and second rear support surfaces are located in different planes.

Preferably, the rear surface is V-shaped in a top view.

According to an aspect of the invention, the grooving insert comprises exactly one cutting edge.

By such a grooving insert, the maximum grooving depth possible is increased. More specified, the design of the grooving insert can be made without any need for compromises, which may reduce the stability of the insert in an insert seat, or which may make the manufacturing of the grooving insert and/or insert seat more difficult.

The grooving insert is thus single sided. An area of the top surface in a top view is greater than an area of the bottom surface in a bottom view.

The rear surface of the grooving insert is free from being adjacent to a cutting edge.

In a top view, the top front portion is a head-like portion connected to the top rear portion which is a stem-like portion.

Formulated differently, in a top view the width of the top front portion is greater than the width of the top rear portion, where the widths are measured perpendicular to the first plane.

According to an aspect of the invention, the top rear portion comprises a central structure symmetrically or substantially symmetrically arranged in relation to a sixth plane, wherein the sixth plane intersects the front surface and the rear surface, wherein the first plane and the sixth plane forms an angle ε of 0.5-5.0° relative to each other, wherein angle ε and angle α are equally large, where angle α is the angle which the first plane and the second plane forms relative to each other, wherein the second plane and the sixth plane are parallel and spaced apart, and wherein a distance from the second side surface to the sixth plane is shorter than a distance from the second side surface to the second plane.

The first plane and the sixth plane form an angle ε of 0.5-5.0° relative to each other in a top view.

By such a grooving insert, the risk of incorrect mounting of the grooving insert in a face grooving tool body insert seat is reduced. For face grooving, two types of curvature of blade portions are common, which may require two different types of grooving insert, which are mirror views of each other in top and bottom views. Therefore, there is a risk of incorrect mounting where the wrong type of grooving insert is put in the insert seat.

The central structure, which is part of the top rear portion, can be in the form of e.g. a groove or a ridge.

According to an aspect of the invention, the central structure of the top rear portion is a third groove, wherein the third groove is spaced apart in relation to each of the first and second side surfaces, wherein the sixth plane intersects the cutting edge at an intersection point which is spaced apart from the mid-point of the cutting edge, and wherein a distance from the second side surface to the intersection point is shorter than a distance from the second side surface to the mid-point of the cutting edge.

Formulated differently, an extension of a center line of the third groove, located in the sixth plane, intersects the cutting edge at an intersection point which is spaced apart from the mid-point of the cutting edge.

In other words, the sixth plane intersects the cutting edge at an intersection point which is spaced apart from the mid-point of the cutting edge.

According to an aspect of the invention the top front portion is wider than the top rear portion, where the widths are measured perpendicular to the second plane.

By such a grooving insert, the risk of interference of the top rear portion is reduced.

According to an aspect of the invention, the top support surface comprises a first top support surface, adjacent to the first side surface, and a second top support surface, adjacent to the second side surface, wherein the third groove extends between the first and second top support surfaces, wherein the bottom support surface comprises a first bottom support surface, adjacent to the first side surface, and a second bottom support surface, adjacent to the second side surface, wherein the first groove extends between the first and second bottom support surfaces, wherein a width of the second top support surface is increasing towards the rear surface, where the widths are measured in planes perpendicular to the first plane.

The third groove extends between, i.e. separating, the first and second top support surfaces.

The first groove extends between, i.e. separating, the first and second bottom support surfaces.

The first top support surface and the second top support surface are preferably planar surfaces located in different planes which intersect in the third groove.

The first bottom support surface and the second bottom support surface are preferably planar surface located in different planes which intersect in the first groove.

According to an aspect of the invention, a width of each of the first top support surface, the first bottom support surface, and the second bottom support surface is decreasing towards the rear surface, where the width of the second top support surface is measured in a plane perpendicular to the first plane.

According to a further aspect of the invention, is provided a grooving tool comprising the grooving insert and a face grooving tool body, the face grooving tool body comprising a blade portion, the blade portion comprising a top surface, an opposite bottom surface, a first side surface and an opposite second side surface, a front end and an opposite rear end, a longitudinal axis of the blade portion coinciding with a primary cutting feed direction of the blade portion, an insert seat in which the grooving insert is seated, the insert seat opens in the front end, the insert seat comprises an upper clamping surface formed in the upper blade portion, in contact with the top support surface, the bottom surface comprising a bottom support surface, an opposite lower support surface formed in the lower blade portion, in contact with the bottom support surface, and a rear support surface in contact with the rear surface, wherein a lower support surface central axis forms an angle 1-45° relative to the longitudinal axis in a side view such that the lower support surface central axis and the longitudinal axis in a side view intersect forward of the front end, wherein the first side surface is curved around a first side surface axis of curvature, wherein the first side surface axis of curvature is parallel to the longitudinal axis, wherein second side surface is curved around the second side surface axis of curvature, wherein the first side surface of the blade portion and the first side surface of the grooving insert is facing the first and second side surface axes of curvature, wherein the second plane intersects the first side surface axis of curvature rearwards of the front surface of the grooving insert.

DESCRIPTION OF THE DRAWINGS

The present invention will now be explained in more detail by a description of different embodiments of the invention and by reference to the accompanying drawings.

FIG. 11 is a perspective view of a second face grooving tool body.

FIG. 12 is a perspective view of a third face grooving tool body.

FIG. 13 is a perspective view of a fourth face grooving tool body.

FIG. 14 is a perspective view of fifth face grooving tool body.

FIG. 15 is a front view of the face grooving tool body in FIG. 14.

FIG. 16 is a top view of a face grooving tool body in FIG. 14.

FIG. 24 is a perspective view of a grooving insert according to a second embodiment.

FIG. 25 is a front view of the grooving insert in FIG. 24.

FIG. 26 is a rear view of the grooving insert in FIG. 24.

All drawings or figures have been drawn to scale.

DETAILED DESCRIPTION OF EMBODIMENTS OF THE INVENTION

Figure 1:
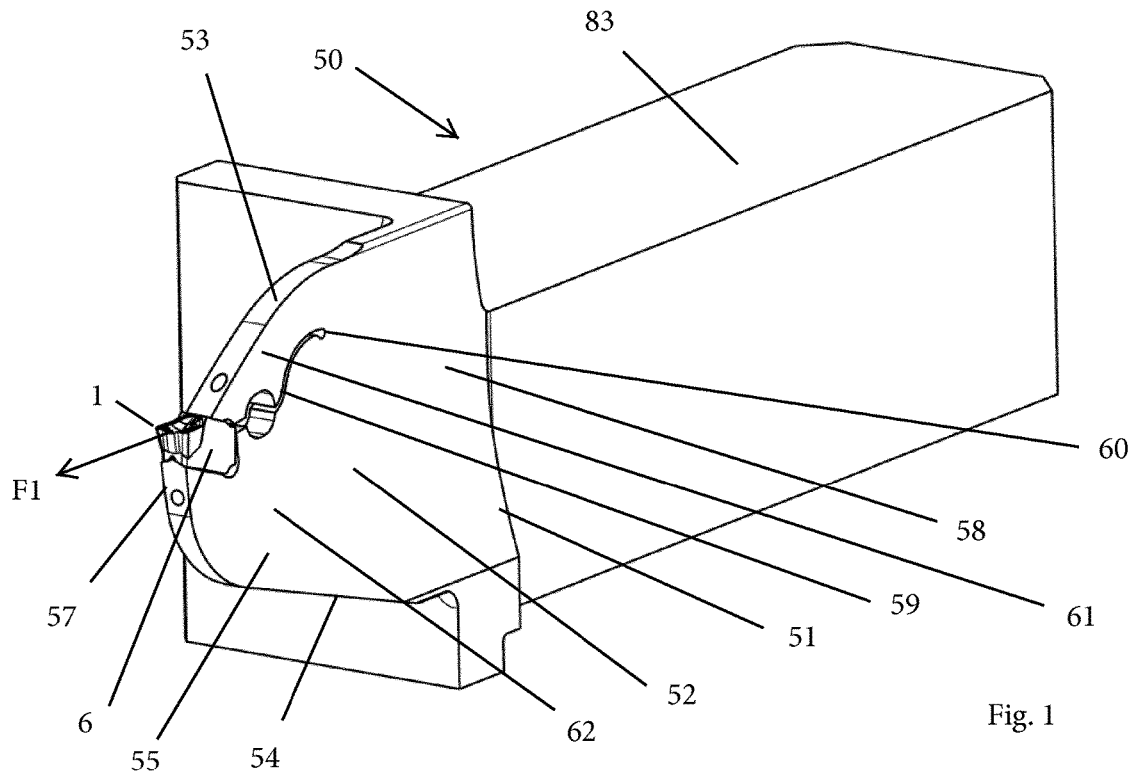
FIG. 1 is a perspective view of a face grooving tool comprising a first face grooving tool body and a grooving insert according to a first embodiment.

Reference is made to FIG. 1, which show a face grooving tool 50 comprising a first face grooving tool body 51 and a grooving insert 1 according to a first embodiment positioned in an insert seat. The grooving insert 1 is made from a harder material, e.g. cemented carbide, than the face grooving tool body 51, which is made from steel. The face grooving tool body 51 comprises a blade portion 52. The blade portion 52 comprises a top surface 53, an opposite bottom surface 54, a first side surface 55 and an opposite second side surface (not shown), a front end 57 and an opposite rear end 58. A longitudinal axis of the blade portion 52 coincides with a primary cutting feed direction F1 of the blade portion 52. The primary cutting feed direction F1, which defines a front or forward direction of the face grooving tool 50, is the direction in which the face grooving tool 50 moves during cutting or machining relative to a rotating metal work piece, in which a circular groove is formed. The circular groove has a width which corresponds to the width of a main cutting edge of the grooving insert 1 of the face grooving tool 50. An upper blade portion 61 associated with the top surface 53 and a lower blade portion 62 associated with the bottom surface 54 are separated by a slit 59 extending from the front end 57 to a rear slit end 60. The upper blade portion and lower blade portions 61, 62 are permanently connected rearward of the rear slit end 60. The slit 59 intersects, or opens into, the first and second side surfaces 55, 56. The slit 59 comprises an insert seat 63 for the grooving insert 1 which opens in the front end 57. The face grooving tool body 51 comprises a clamping portion 83, in the form of a shank having a square shaped cross section, extending in a direction parallel to the longitudinal axis A1. The blade portion 52 and the clamping portion 83 are permanently connected, more precisely; they are one singular unit formed from a singular piece of metal.

Figure 2:
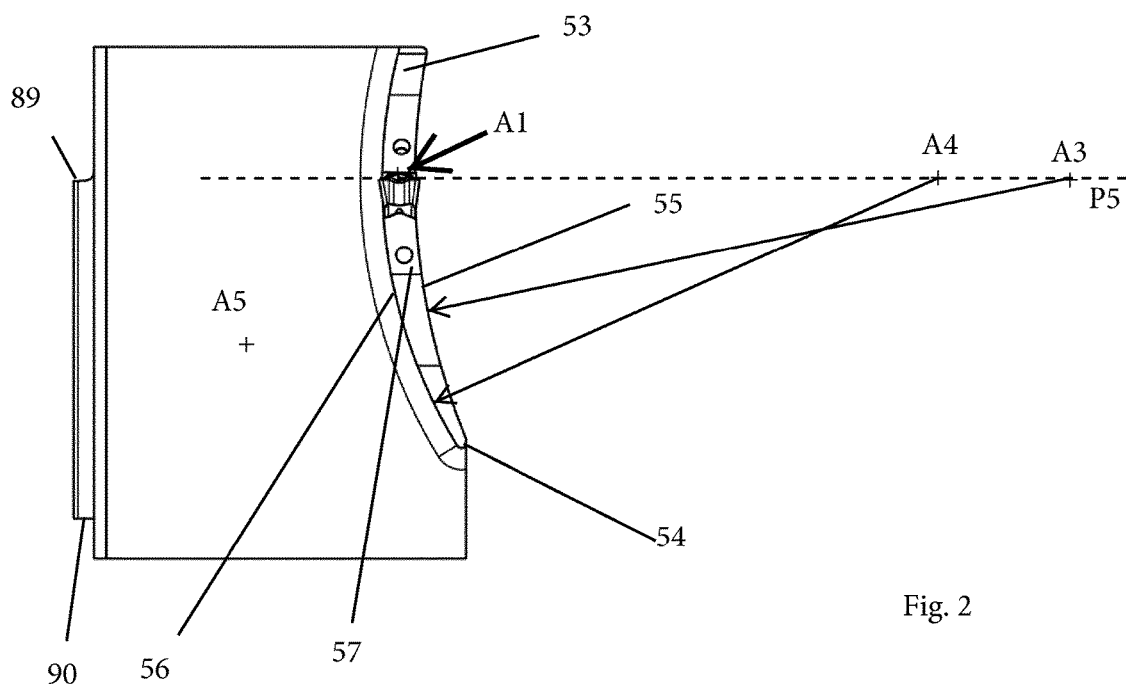
FIG. 2 is a front view of the face grooving tool in FIG. 1.

Reference is now made to FIG. 2. The second side surface 56 of is curved around a second side surface axis of curvature A4 parallel to the longitudinal axis A1 of the blade portion, such that all parts of the second side surface 56 has a constant distance to the second side surface axis of curvature A4. The first side surface 55 is curved around a first side surface axis of curvature A3, such that all parts of the first side surface 55 has a constant distance to the first side surface axis of curvature A3. The first and second side surface axes of curvature A3, A4 are parallel to the longitudinal axis A1 of the blade portion. The first side surface 55 is facing the first and second side surface axes of curvature A3, A4. A distance from the first side surface 55 to the first side surface axis of curvature A3 is shorter than a distance from the first side surface 55 to the second side surface axis of curvature A4.

The longitudinal center axis A5 of the clamping portion is parallel to the longitudinal axis A1.

The bottom surface 90 of the clamping portion 83 is located in a plane parallel to P5, where P5 is a reference plane in which at least 50% of the cutting edge is located.

The longitudinal axis A1 is located in the reference plane P5.

A distance from the bottom surface 90 of the clamping portion 83 to the top surface 53 of the blade portion 52 is greater than a distance from the bottom surface 90 of the clamping portion 83 to the top surface 89 of the clamping portion 83.

Figure 3:
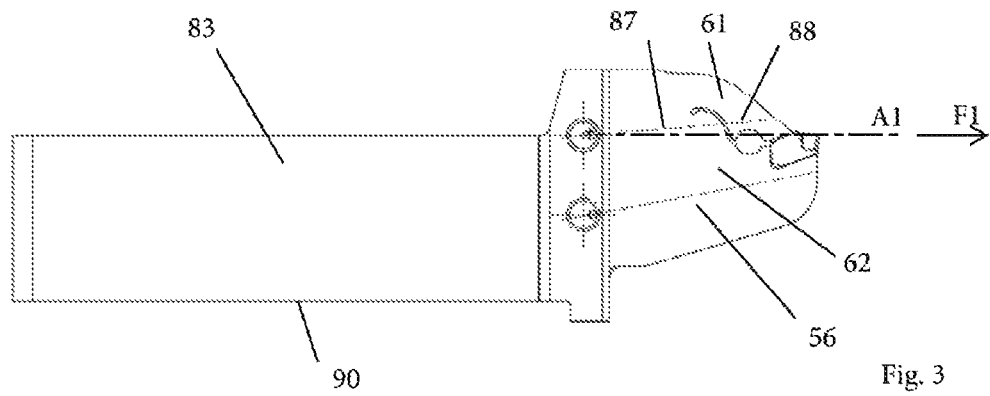
FIG. 3 is a first side view of the face grooving tool in FIG. 1.

Reference is now made to FIG. 3. It can be seen that the longitudinal axis A1 of the blade portion coincides a primary cutting feed direction F1 of the blade portion. The blade portion 52 comprises a fluid channel, comprising a first fluid channel portion 87 in the lower blade portion 62 having an outlet opening into the slit 59, and a second fluid channel portion 88 in the upper blade portion 61 having an inlet opening into the slit 59. The second fluid channel portion 88 is a through hole. The first and second fluid channel portions 87, 88 extend along a common axis, and extend between the first and second side surfaces. In FIG. 3, the second side surface 56 is facing the viewer. The bottom surface 90 of the clamping portion 83 is located in a plane parallel to the longitudinal axis A1 of the blade portion.

Figure 4:
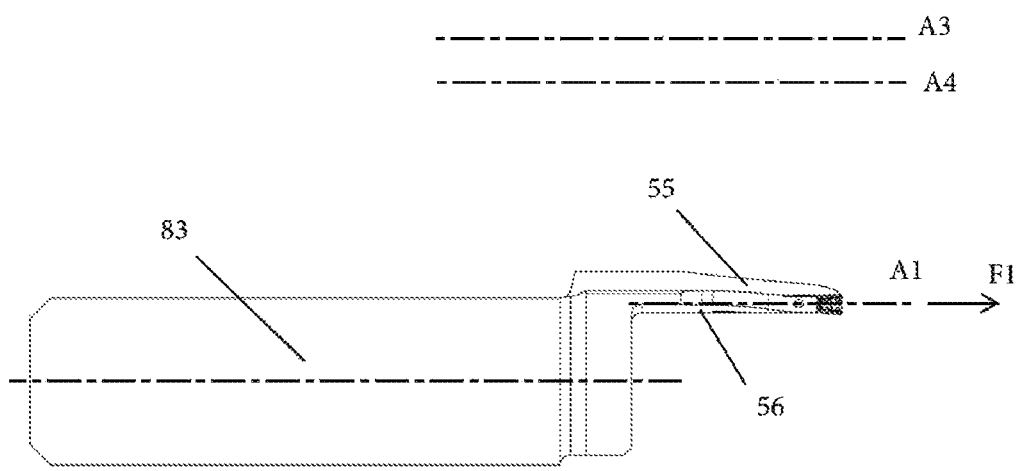
FIG. 4 is a top view of the face grooving tool in FIG. 1.

Reference is now made to FIG. 4. The first and second side surface axes of curvature A3, A4 are parallel to the longitudinal center axis A5 of the clamping portion 83 and the longitudinal axis A1 of the blade portion, which coincides with a primary cutting feed direction F1 of the blade portion. Distances from the first side surface 55 to the first and second side surface axes of curvature A3, A5 is greater than distances from the second side surface 56 to the first and second side surface axes of curvature A3, A4.

Figure 5:
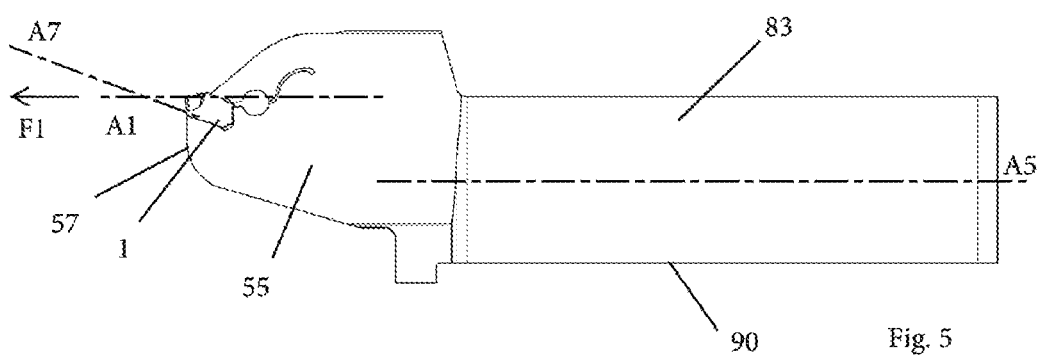
FIG. 5 is a second side view of the face grooving tool in FIG. 1.

Reference is now made to FIG. 5. A lower support surface central axis A7 forms an angle 1-45°, in FIG. 5 the angle is 15-25°, relative to the longitudinal axis A1 in a side view, as shown in FIG. 5, such that the lower support surface central axis A7 and the longitudinal axis A1 in a side view converge forward of the front end 57. The lower support surface central axis A7 forms an identical angle relative to the longitudinal center axis A5 of the clamping portion 83.

The lower support surface is a support surface for the grooving insert 1 located in the insert seat. In FIG. 5, the first side surface 55 is facing the viewer. The lower support surface central axis A7 intersects a plane comprising the bottom surface 90 of the clamping portion 83 rearward of the front end 57.

Figure 6:
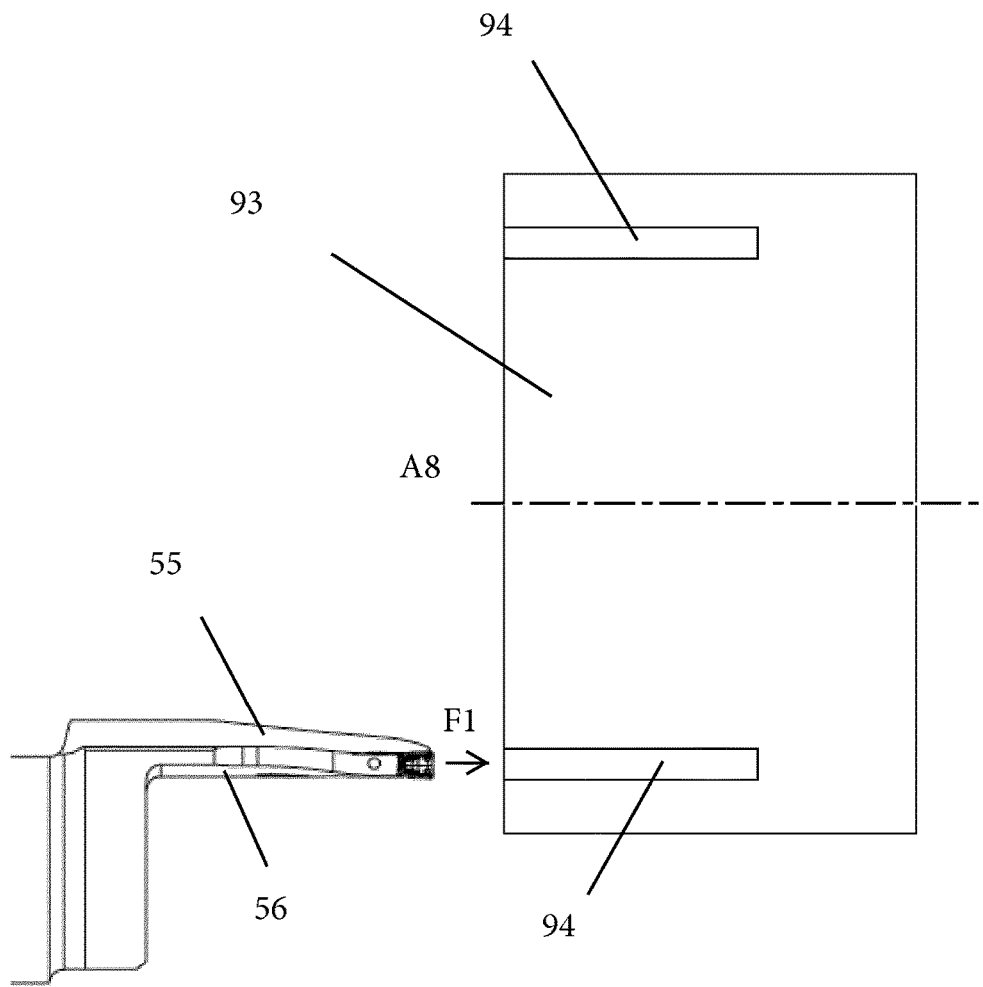
FIG. 6 is a top view of the face grooving tool in FIG. 1 and a metal work piece.

Reference is now made to FIG. 6. A metal work piece 93 is rotatable around a rotation axis A8. When the face grooving tool is moved relative in a primary cutting feed direction F1 of the blade portion, a circular groove 94 is formed in the metal work piece 93, having a center thereof coinciding with the rotation axis A8 of the metal work piece 93. The width of the circular groove 98, i.e. the distance between a radially inner and a radially outer side wall of the circular groove 98, corresponds to the width of the cutting edge of the grooving insert mounted in the insert seat of the face grooving tool body. A distance from the first side surface 55 to the first side surface axis of curvature is equal or greater than a distance from the rotation axis A8 of the metal work piece 93 to the radially inner side wall of the circular groove 98.

A distance from the second side surface 56 to the second side surface axis of curvature is equal or smaller than a distance from the rotation axis A8 of the metal work piece 93 to the radially outer side wall of the circular groove 98. The depth of the circular groove 94, i.e. the extension parallel to the rotation axis A8 of the metal work piece 93, is equal to or smaller than a distance, measured along the longitudinal axis of the blade portion, from the rear end of the blade portion to the active cutting edge of the grooving insert. When machining the circular groove 94, the first side surface of the grooving insert is facing the radially inner wall surface of the circular groove 94, and the second side surface of the grooving insert is facing the radially outer wall surface of the circular groove 94.

Figure 7:
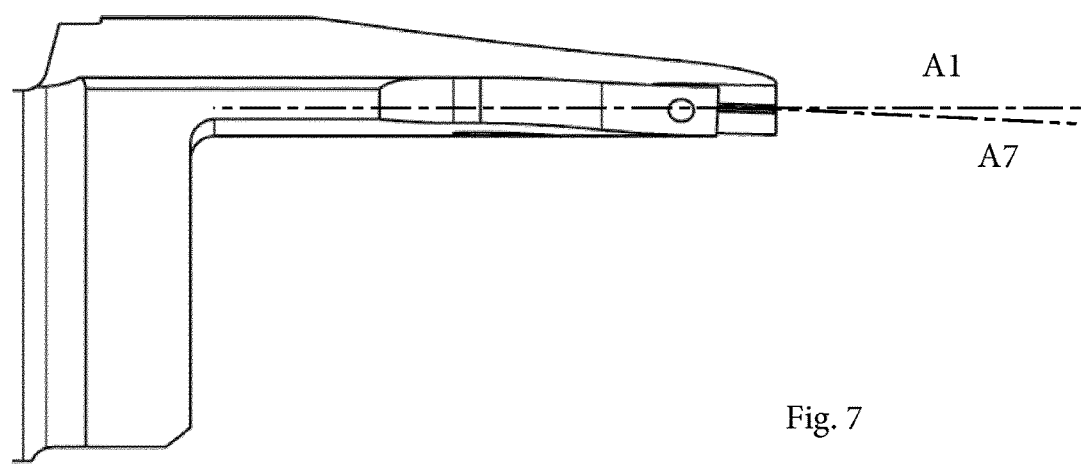
FIG. 7 is a top view of the face grooving tool body in FIG. 1.

Reference is now made to FIG. 7. Here it is shown that the lower support surface central axis A7 in a top view forms an angle 0.5-5.0°, in FIG. 7 the angle is 2-3°, relative to the longitudinal axis A1 of the blade portion.

Figure 8:
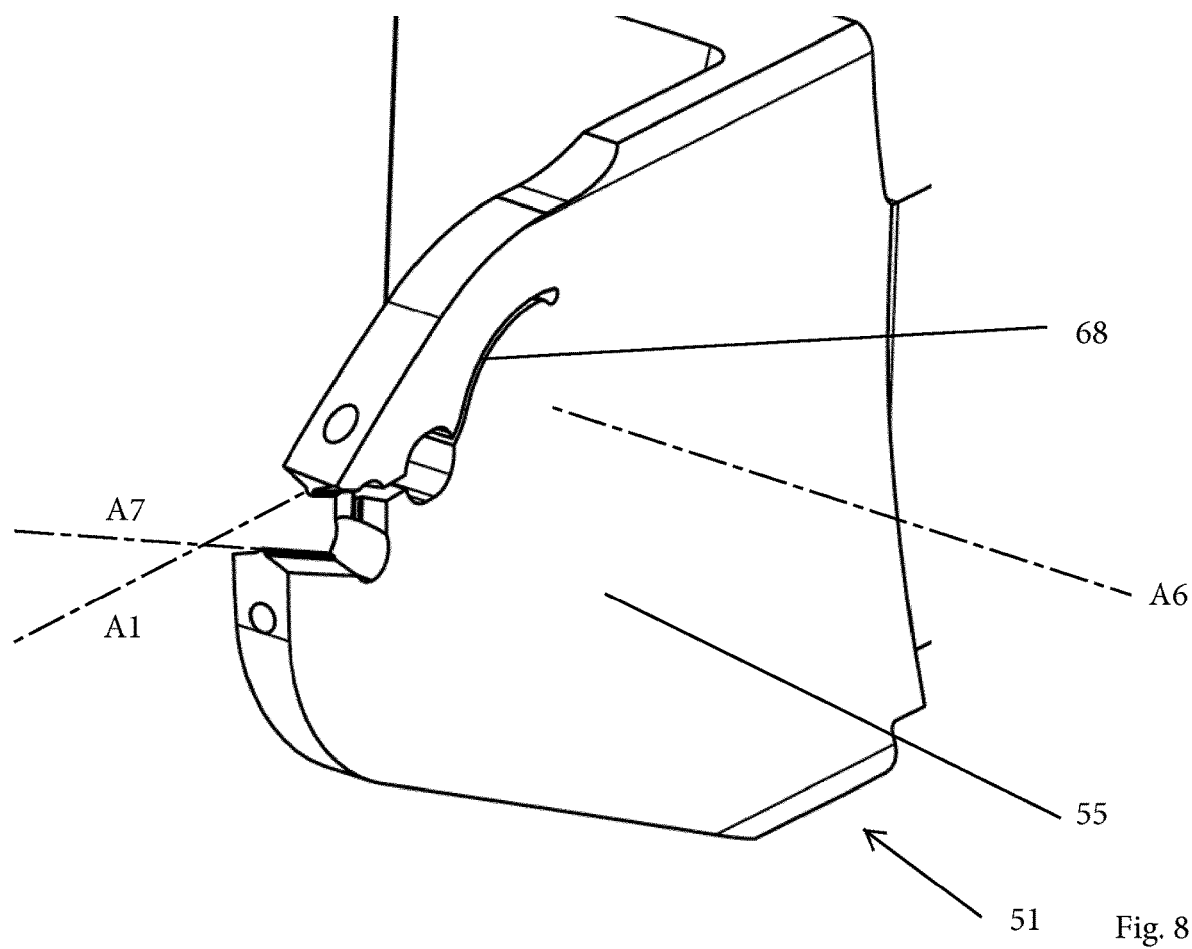
FIG. 8 is a perspective view of the face grooving tool body in FIG. 1.

Reference is now made to FIG. 8, showing a portion of the face grooving tool body 51, where it is shown that the lower support surface central axis A7 and the longitudinal axis A1 converge forward of the front end 57. The slit comprises a slit portion 68, wherein at least a major portion of the slit portion 68 is curved around an axis A6, which intersect the lower blade portion, which axis A6 is substantially perpendicular to the longitudinal axis A1 of the blade portion. The first side surface 55 is shown.

Figure 9:
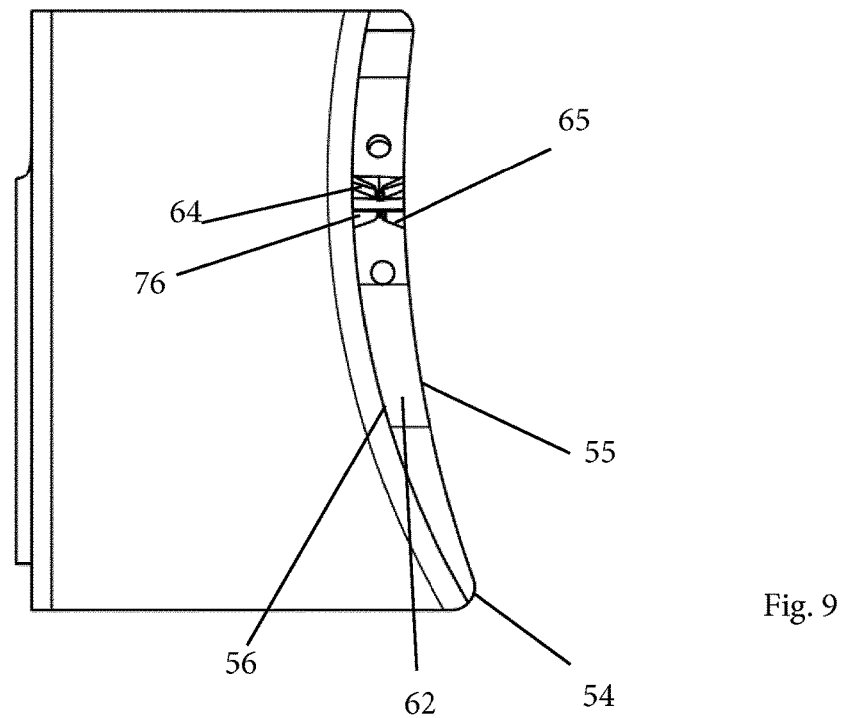
FIG. 9 is a front view of the face grooving tool body in FIG. 1.

Reference is now made to FIG. 9, which show that the insert seat comprises an upper clamping surface 64 formed in the upper blade portion, an opposite lower support surface 65 formed in the lower blade portion, and a rear support surface 76 formed in the lower blade portion. The insert seat extends between the first and second side surfaces 55, 56 of the blade portion. As can also be seen in e.g. FIG. 8, the upper clamping surface 64, the lower support surface 65 and the rear support surface 76 each comprise a central structure, in the form of a central ridge, separating non-coplanar surfaces. A width of the lower blade portion 62, measured as the distance between the first and second side surfaces 55, 56 of the lower blade portion 62, is decreasing from the lower support surface 65 towards the bottom surface 54 of the lower blade portion 62.

Figure 10:
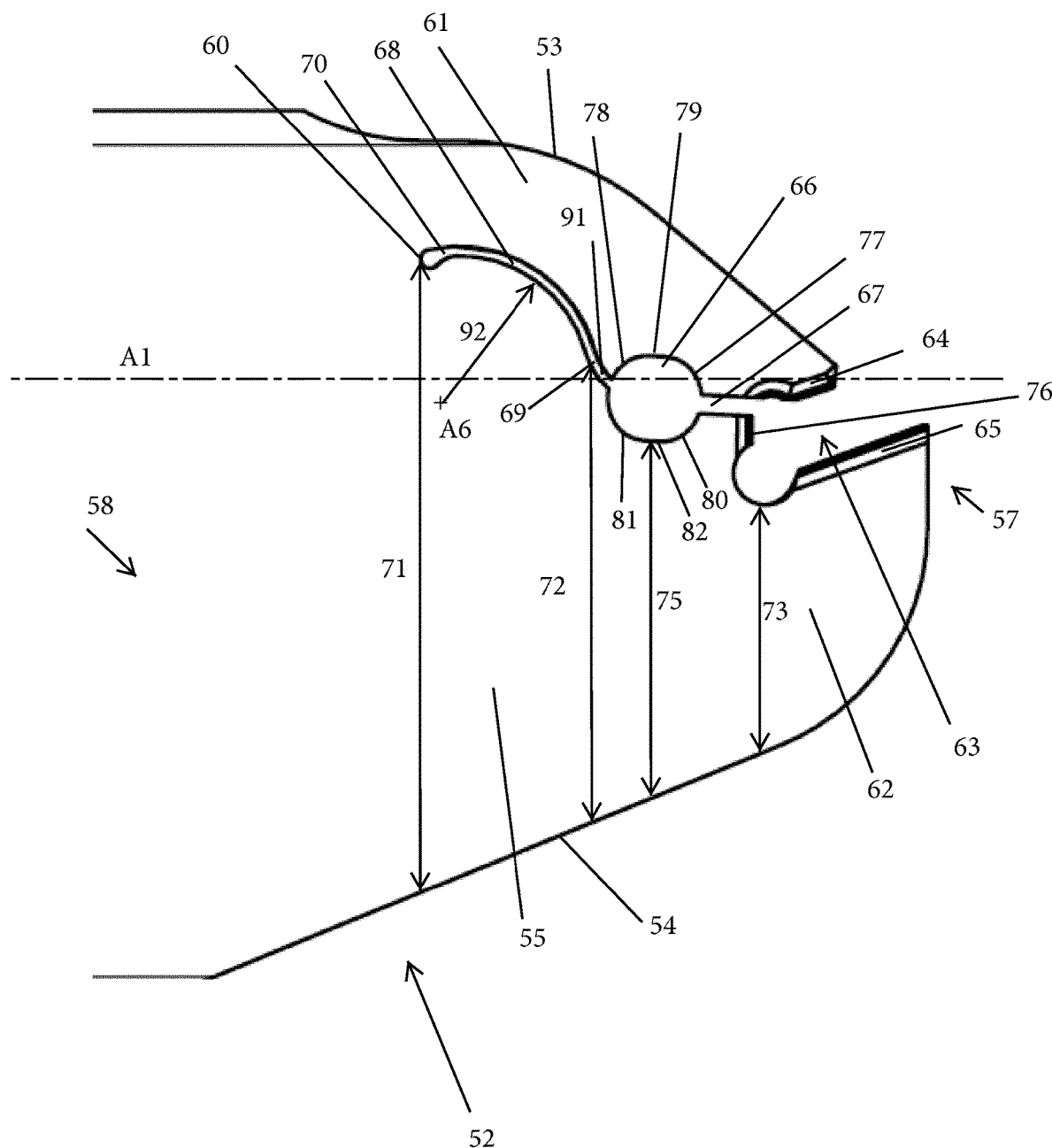
FIG. 10 is a mirror view of the face grooving tool body in FIG. 5.
Figure 17:
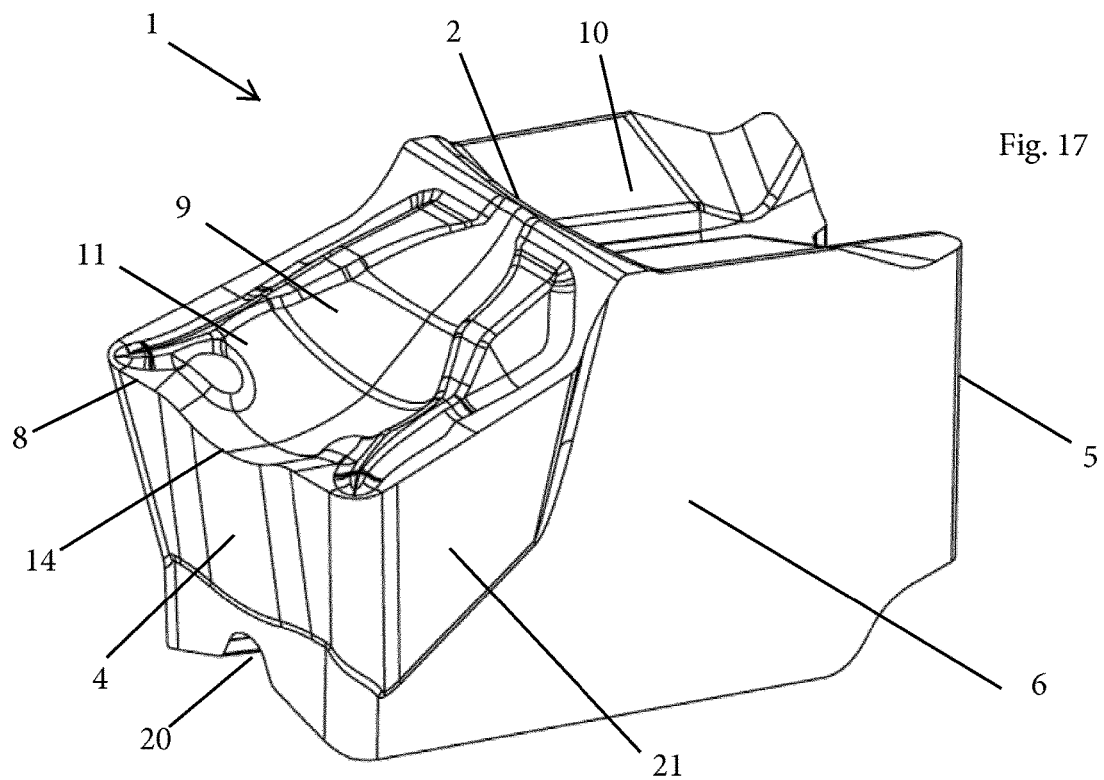
FIG. 17 is a perspective view of the grooving insert in FIG. 1.

Reference is now made to FIG. 10, which is a mirror view of FIG. 5. The blade portion 52 comprises a top surface 53, an opposite bottom surface 54, a first side surface 55 and an opposite second side surface, a front end 57 and an opposite rear end 58. A distance between the top and bottom surfaces 53, 54 is increasing from the front end 59 towards the rear end 58 up to at least the rear end of the slit portion 59. An upper blade portion 61 associated with the top surface 53 and a lower blade portion 62 associated with the bottom surface 54, are separated by a slit extending from the front end 57 to a rear slit end 60. The slit comprises, adjacent to the front end 57, an insert seat 63 for a grooving insert. The insert seat 63 comprises an upper clamping surface 64 formed in the upper blade portion 61, an opposite lower support surface 65 formed in the lower blade portion 62, and a rear support surface 76 formed in the lower blade portion 62. The lower support surface 65 extends a greater distance from the rear end 58 than the distance the upper clamping surface 64 extends from the rear end 58. The slit 59 comprises a key hole 66, and a slit portion 68 extending between a slit portion front end 69 and a slit portion rear end 70. The longitudinal axis A1 intersects the key hole 66. The longitudinal axis A1 intersects the upper clamping surface 64. The slit portion 68 is located between the rear slit end 60 and the key hole 66. A slit gap intersecting a center of the key hole 66 is greater than a slit gap at the slit portion 68. The key hole 66 is located between the slit portion 68 and the insert seat 63. The key hole 66 comprises a first and a second concave surface 77, 78, formed in the upper blade portion 61, and connected by a first flat surface 79. The key hole 66 further comprises a third and a fourth concave surface 80, 81, formed in the lower blade portion 62, and connected by a second flat surface 82. The key hole 66 comprises substantially opposite openings towards the insert seat 63 and towards the slit portion 68, respectively. In other words, the key hole is part of the slit. The slit comprises a connecting portion 67, connecting the key hole 66 and the insert seat 63, intersecting the insert seat 63 between the rear support surface 76 and the upper clamping surface 64. A second connecting portion 91, convex in side view, is located between and connecting the key hole 66 and the slit portion 68. At least a major portion of the slit portion 68 is curved or substantially curved around an axis A6, intersecting the lower blade portion 62, at a radius of curvature 92. The slit portion 68 or a major portion of the slit portion 68 is concave or substantially concave in a side view as seen in e.g. FIG. 10. The radius of curvature 92 is substantially equal to, i.e. 75%-125%, of a shortest distance between the slit portion front end 69 and the slit portion rear end 70. The length of the slit portion 68 as defined as a shortest distance between the slit portion front end 69 and the slit portion rear end 70 is greater than the length of the key hole 66. The slit portion 68 is located between the rear slit end 60 and the insert seat 63. A distance 71 from the bottom surface 54 to the rear slit end 60 is greater than a distance 72 from the bottom surface 54 to the slit portion 68 front end 69 or to the second connecting portion 91. The slit portion 68 has a constant or substantially constant slit gap. The first side surface 55 of the lower blade portion 62 is formed as a continuous surface which runs uninterrupted from the slit to the bottom surface 54. A distance 73 from the bottom surface 54 to a lowest point of the insert seat 63 is smaller than a distance 75 from the bottom surface 54 to the key hole 66. A distance from rear support surface 76 to the rear slit end 60 is greater than a distance from rear support surface 76 to the front end 57 of the slit portion 68. The rear slit end 60 preferably comprises a border surface in the shape of a circular arc.

Reference is now made to FIG. 11, which is a perspective view of a second face grooving tool body. The only substantial difference compared to the first face grooving tool body is the position of the blade portion relative to the clamping portion 83, and the shape of the clamping portion 83. In the second embodiment, the clamping portion 83 is circular in a cross section, and comprises 4 screw holes. The face grooving tool body is suitable for internal face grooving, i.e. face grooving inside a hole in a metal work piece.

Reference is now made to FIG. 12, which is a perspective view of a third face grooving tool body. The only substantial difference compared to the first face grooving tool body is the shape of the clamping portion 83. For the third face grooving tool body, the clamping portion 83 is circular in a cross section, and comprises 4 screw holes.

Reference is now made to FIG. 13, which is a perspective view of a forth face grooving tool body. The only substantial difference compared to the first face grooving tool body is the shape of the second side surface 56. More specifically, a rear portion of lower blade portion 56 is widened, rearward of the key hole 66. Thus, the mechanical strength of the lower blade portion 56 is further increased.

Reference is now made to FIGS. 14-16 which shows a fifth face grooving tool body. The only substantial difference compared to the first face grooving tool body is that the longitudinal center axis A5 of the clamping portion is perpendicular to the longitudinal axis A1. The blade portion, including the first and second side surfaces 55, 56, is identical to the blade portion according to the first embodiment.

Reference is now made to FIGS. 17-23, which show the grooving insert 1, according to a first embodiment, which is part of the face grooving tool in FIG. 1. The grooving insert 1 comprises a front surface 4 and an opposite rear surface 5, a first side surface 6 and an opposite second side surface 7, a top surface 2 and an opposite bottom surface 3.

An area of the top surface 2 in a top view is greater than an area of the bottom surface 3 in a bottom view. The top surface 2 comprises a top front portion 9 and a top rear portion 10. The top front portion 9 comprises a rake face 11 and a cutting edge 8. The cutting edge 8 is partly formed in an intersection between the rake face 11 and the front surface 4, and partly formed in an intersection between the rake face 11 and the first and second side surface 6, 7, respectively. The top front portion 9 comprises a non-planar chip forming surface or a chip forming structure. The front surface 4 is a clearance surface when the face grooving tool in which the grooving insert 1 is mounted is moved in a primary cutting feed direction. The cutting edge 8 extends continuously between a first end point 12 and a second end point 13. The first end point 12 is located in an intersection between the first side surface 6 and the top front portion 9. The second end point 13 is located in an intersection between the second side surface 7 and the top front portion 9. The cutting edge 8, the top front portion 9 and the rake face 11 are arranged symmetrically relative to a first plane P1, which first plane P1 intersects a mid-point 14 of the cutting edge 8 and intersects the rear surface 5.

Figure 20:
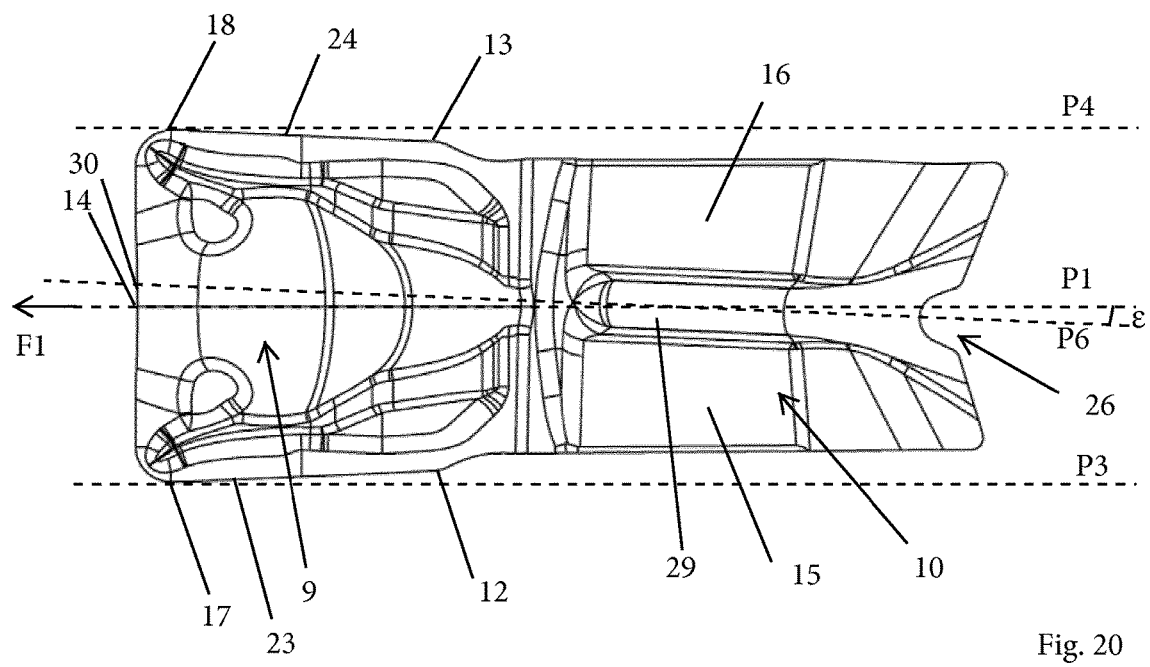
FIG. 20 is a top view of the grooving insert in FIG. 17.

As can be seen in e.g. FIG. 20, the cutting edge 8 comprises a main cutting edge portion extending perpendicular to the first plane P1, which is 1.0-20.0 mm, in FIG. 20 the main cutting edge portion is 2.0-4.0 mm.

The main cutting edge portion is connected to the first portion 23 of the cutting edge 8 through a first arc shaped corner cutting edge. The first arc shaped corner cutting edge comprises a first distal edge portion 17.

In a similar manner, the main cutting edge portion is connected to the second portion 24 of the cutting edge 8 through a second arc shaped corner cutting edge. The second arc shaped corner cutting edge comprises a second distal edge portion 17.

Figure 21:
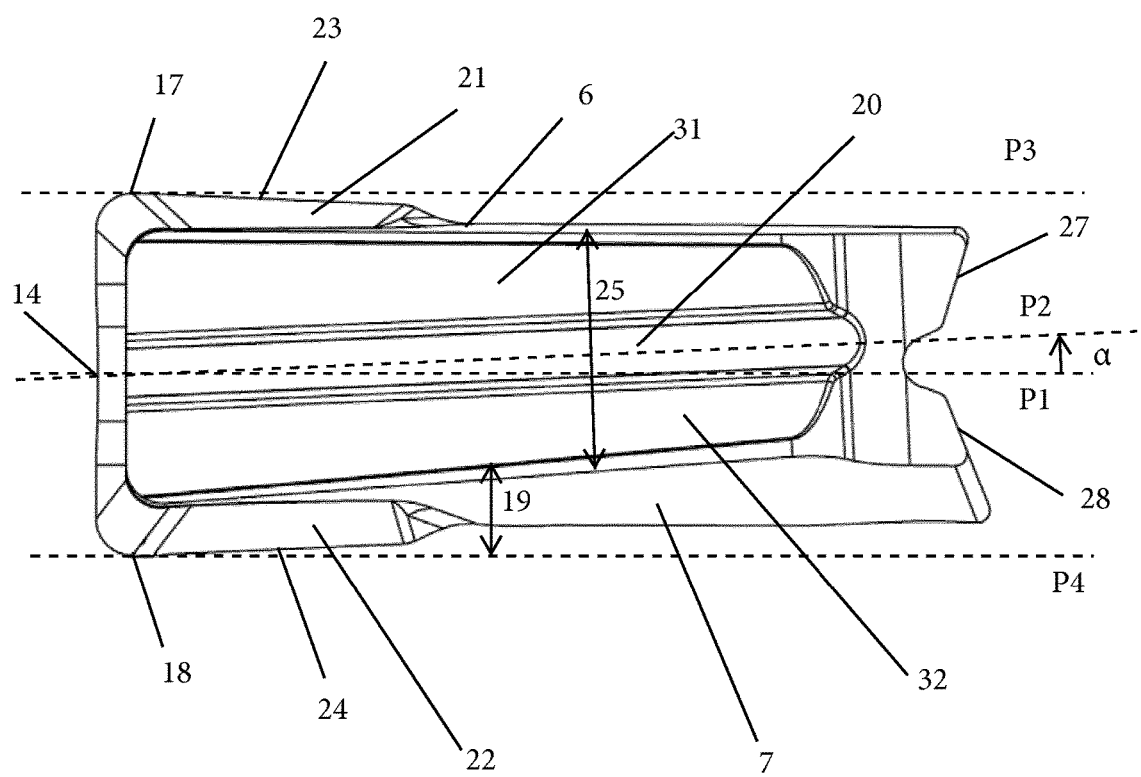
FIG. 21 is a bottom view of the grooving insert in FIG. 17.

The top rear portion 10 comprises a top support surface 15, 16. The bottom surface 3 comprising a bottom support surface 31, 32. At least a major portion of the bottom surface 3 is symmetrically or substantially symmetrically arranged in relation to a second plane P2, which second plane P2 intersects the front surface 4 and the rear surface 5. In FIG. 21, the front end of the bottom surface 3 is not perfectly symmetrically arranged in relation to the second plane P2, because the bottom surface 3 front end is perpendicular to the first plane P1.

Figures 18, 19:
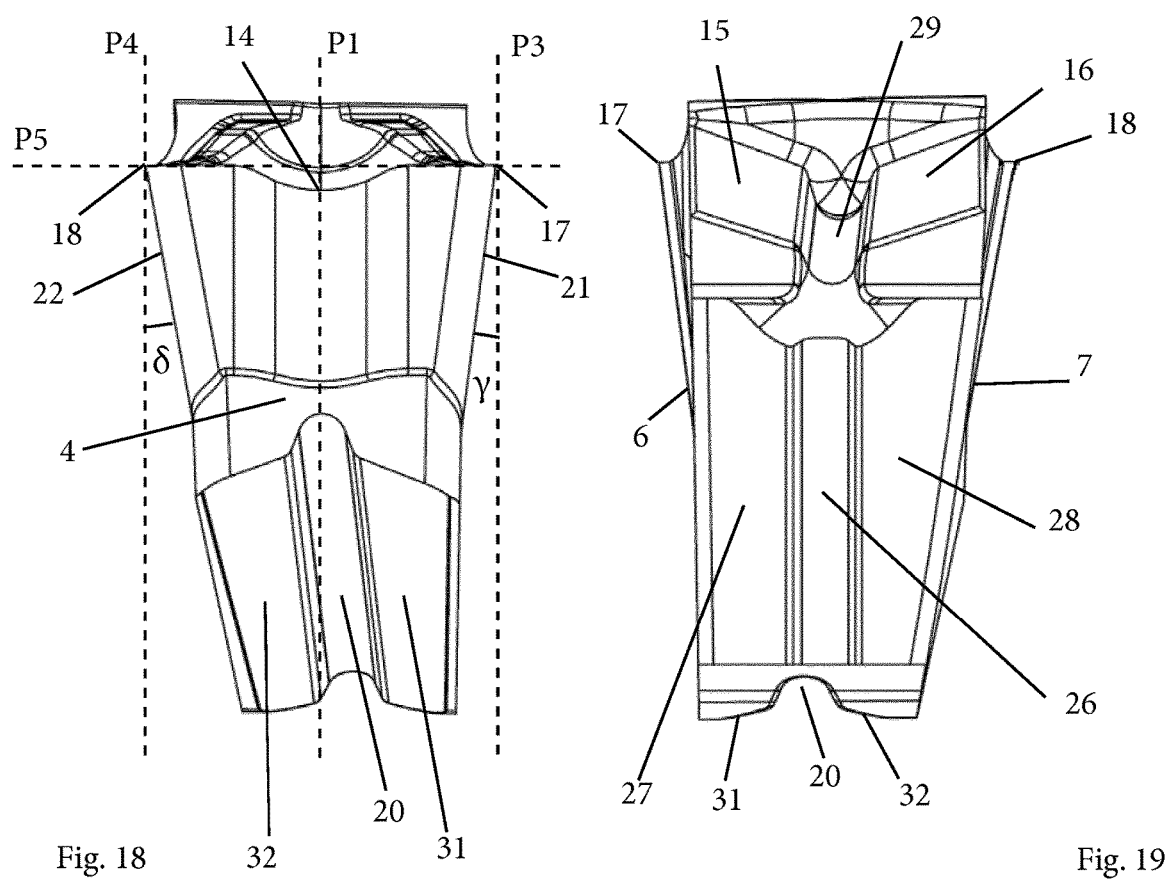
FIG. 18 is a front view of the grooving insert in FIG. 17.
FIG. 19 is a rear view of the grooving insert in FIG. 17.

The first plane P1 and the second plane P2 forms an angle α of 0.5-5.0° relative to each other, which angle α in FIGS. 17-23 is 2.5°. A distance 33 from the bottom surface 3 to a reference plane P5, is increasing away from the front surface 4 towards the rear surface 5. At least 50% of the cutting edge 8, the first end point 12 and the second end point 13 are located in the reference plane P5. The reference plane P5 is perpendicular to the first plane P1. A minor portion of the cutting edge 8, comprising the mid-point 14, is spaced apart from the reference plane P5. The minor portion is symmetrically arranged relative to the mid-point 14, and is concave in a front view, as seen in FIG. 18.

Figure 22:
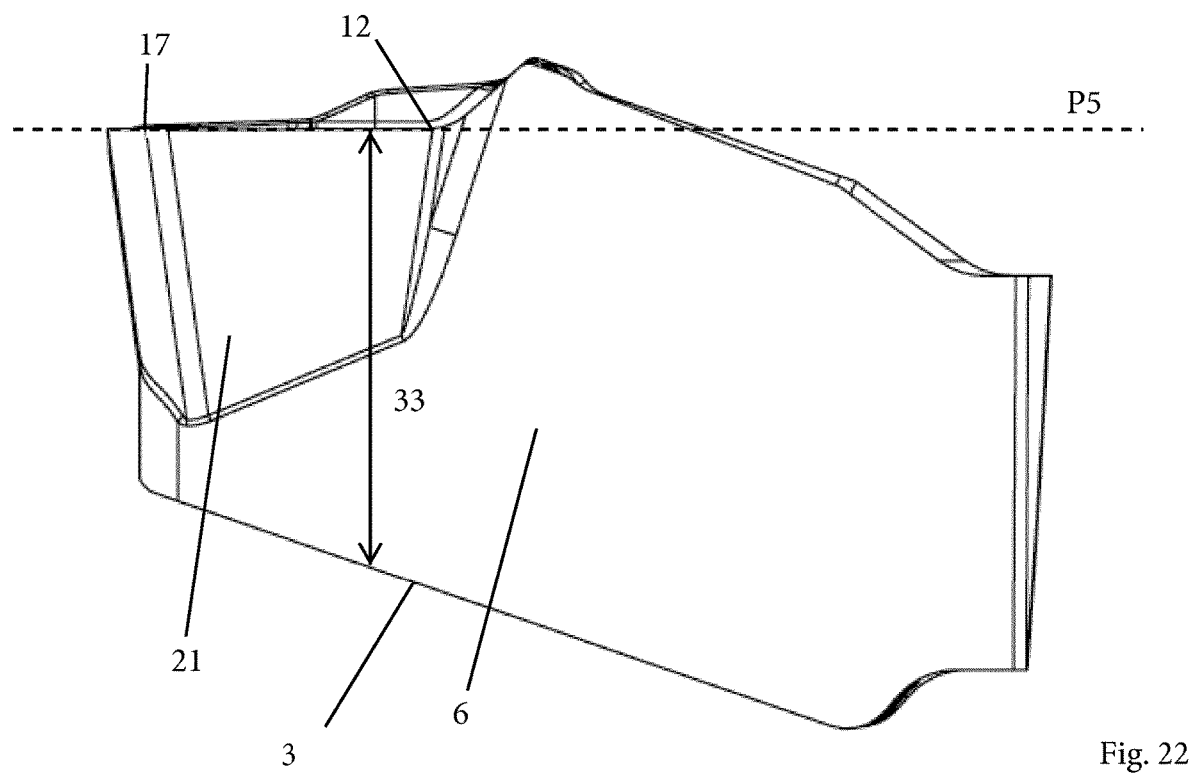
FIG. 22 is a first side view of the grooving insert in FIG. 17.
Figure 23:
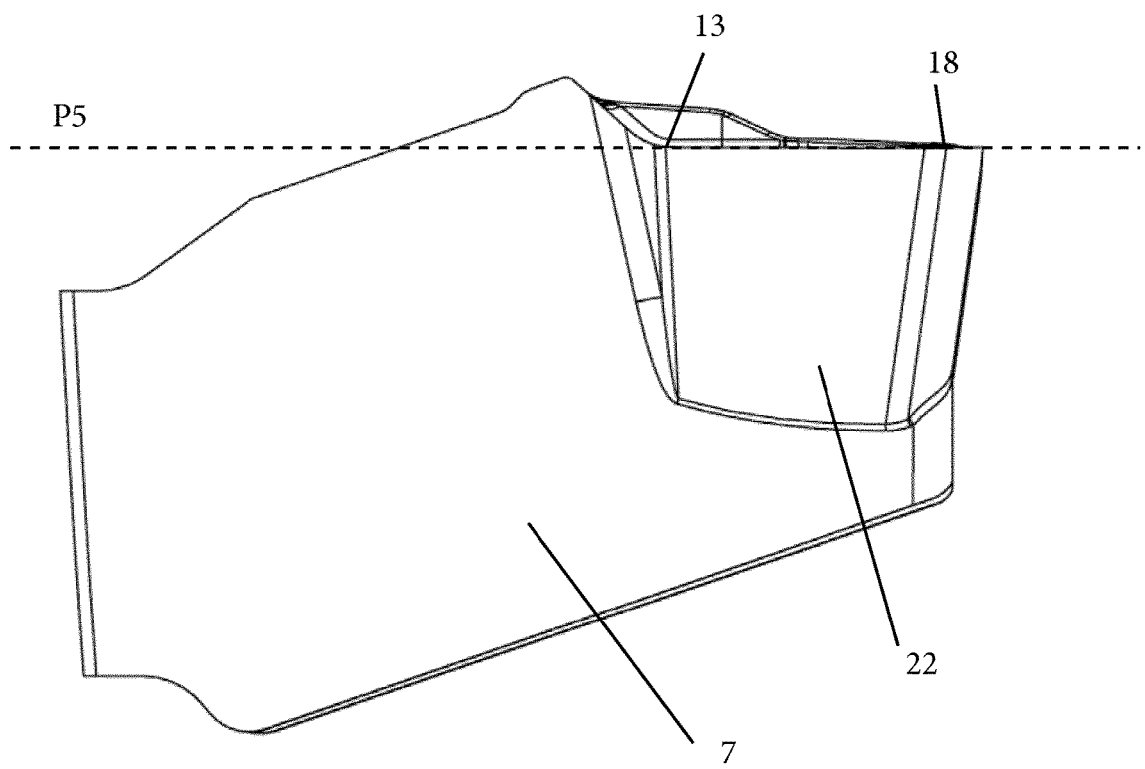
FIG. 23 is a second side view of the grooving insert in FIG. 17.

As seen in FIG. 22 and FIG. 23, in a side view the reference plane P5 and the bottom surface 3 forms an angle relative to each other, which angle is preferably 10-30°.

The cutting edge 8 comprises the first distal edge portion 17, adjacent to the first side surface 6, and the second distal edge portion 18, adjacent to the second side surface 7.

The first and second distal edge portions 17, 18 are the most distal portions of the cutting edge 8 in relation to the first plane P1. When the grooving insert 1 is mounted in the insert seat of the face grooving tool body, and the blade portion is moved in the primary cutting feed direction, the first and second distal edge portions 17, 18 are the surface generating portions of the radially inner and outer side walls of the circular groove formed.

Thus, as can be seen in FIG. 6, the width of the circular groove 98, i.e. the distance between a radially inner and a radially outer side wall of the circular groove 98, corresponds to the distance between the first and second distal edge portions 17, 18.

A third plane P3, parallel to the first plane P1, intersects the first distal edge portion 17. A fourth plane P4, parallel to the first plane P1, intersects the second distal edge portion 18.

A distance 19 from the fourth plane P4 to the bottom support surface 31, 32 is increasing from the front surface 4 towards the rear surface 5.

The bottom surface 3 comprises a first groove 20 symmetrically arranged in relation to the second plane P2 and extending from the front surface 4 to the rear surface 5.

The extension of the first groove 20 corresponds to the extension of the lower support surface 65 central ridge of the insert seat 63. The first side surface 6 comprises a first clearance surface 21 adjacent to a first portion 23 of the cutting edge 8.

The first clearance surface 21 forms a first clearance angle γ in relation to the third plane P3. The second side surface 7 comprises a second clearance surface 22 adjacent to a second portion 24 of the cutting edge 8. The second clearance surface 22 forms a second clearance angle δ in relation to the third plane P3. The second clearance angle δ is larger than the first clearance angle γ. Each of the first and second clearance surfaces 21, 22 and the bottom surface 3 are spaced apart.

An area of the second clearance surface 22 is greater than an area of the first clearance surface 21, as seen in FIGS. 22-23.

A width 25 of the bottom surface 3, perpendicular to the second plane P2, is decreasing away from the front surface 4.

The rear surface 5 comprises a first rear support surface 27 adjacent to the first side surface 6 and a second rear support surface 28 adjacent to the second side surface 7. The rear surface 5 further comprises a second groove 26 extending from the top surface 2 to the bottom surface 3 and extending between the first rear support surface 27 and the second rear support surface 28. An area of the first rear support surface 27 is smaller than an area of the second rear support surface 28.

The grooving insert 1 comprises exactly one cutting edge.

Adjacent the rear surface 5 no cutting edge is formed.

The top rear portion 10 comprises a third groove 29 symmetrically or substantially symmetrically arranged in relation to a sixth plane P6. The sixth plane P6 intersects the front surface 4 and the rear surface 5.

The first plane P1 and the sixth plane P6 form an angle ε of 0.5-5.0° relative to each other. Angle ε and angle α are equally large. The second plane P2 and the sixth plane P6 are parallel and spaced apart. A distance from the second side surface 7 to the sixth plane P6 is shorter than a distance from the second side surface 7 to the second plane P2.

The third groove 29 is spaced apart in relation to each of the first and second side surfaces 6, 7. An extension of the third groove 29 intersects the cutting edge 8 at an intersection point 30. The intersection point 30 is spaced apart from the mid-point 14 of the cutting edge 8. A distance from the second side surface 7 to the intersection point 30 is shorter than a distance from the second side surface 7 to the mid-point 14 of the cutting edge 8. The sixth plane P6 intersects the cutting edge 8 at the intersection point 30. The third groove 29 has a main extension along the sixth plane P6.

The top front portion 9 of the grooving insert 1 is wider than the top rear portion 10, where the widths are measured perpendicular to the second plane P2.

The top support surface 15, 16 comprises a first top support surface 15, adjacent to the first side surface 6, and a second top support surface 16, adjacent to the second side surface 7.

The third groove 29 extends between the first and second top support surfaces 15, 16.

The bottom support surface 31, 32 comprises a first bottom support surface 31, adjacent to the first side surface 6, and a second bottom support surface 32, adjacent to the second side surface 7. The first groove 20 extends between the first and second bottom support surfaces 31, 32.

A width of the second top support surface 16 is increasing towards the rear surface 5, where the width of the second top support surface 16 is measured in a plane perpendicular to the first plane P1.

A width each of first top support surface 15, first bottom support surface 31, and the second bottom support surface 32 is decreasing towards the rear surface 5, where the width of the second top support surface 16 is measured in a plane perpendicular to the first plane P1.

Reference is now made to FIGS. 24-30, which show a grooving insert 1 according to a second embodiment which is mountable in the face grooving tool body in FIG. 1. The grooving insert 1 differs from the grooving insert shown in FIGS. 17-23 only with regards to the top front portion 9, the cutting edge 8, the front surface 4, and the first and second clearance surfaces 21, 22.

Figure 27:
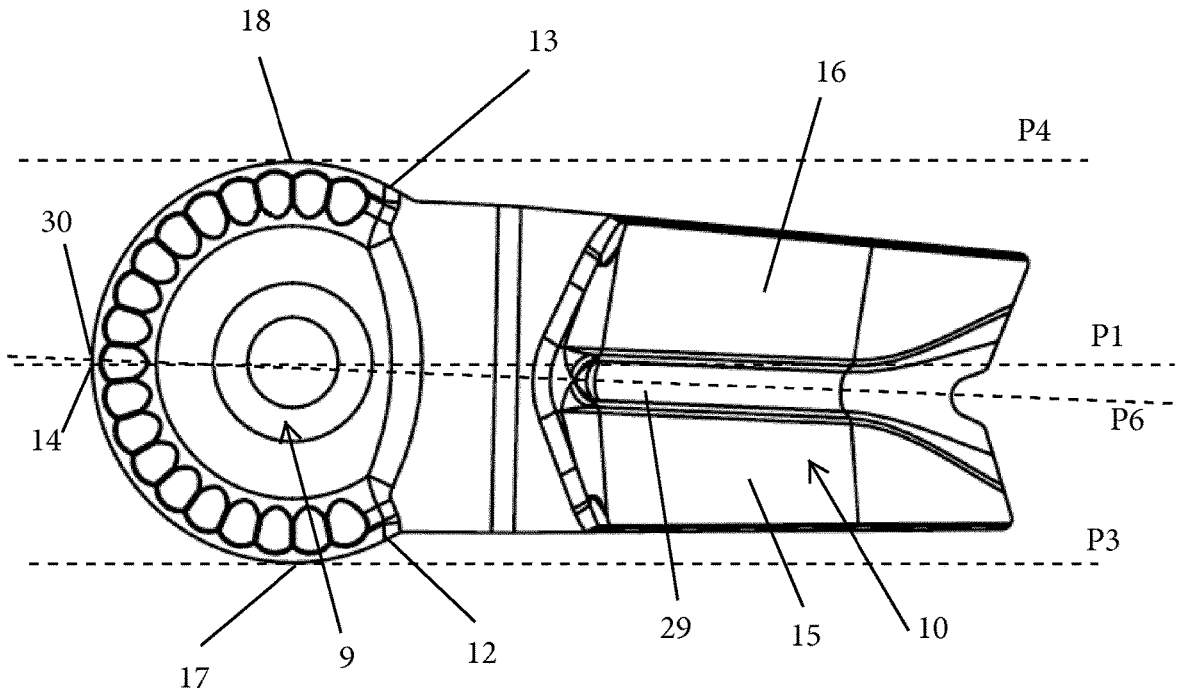
FIG. 27 is a top view of the grooving insert in FIG. 24.
Figure 28:
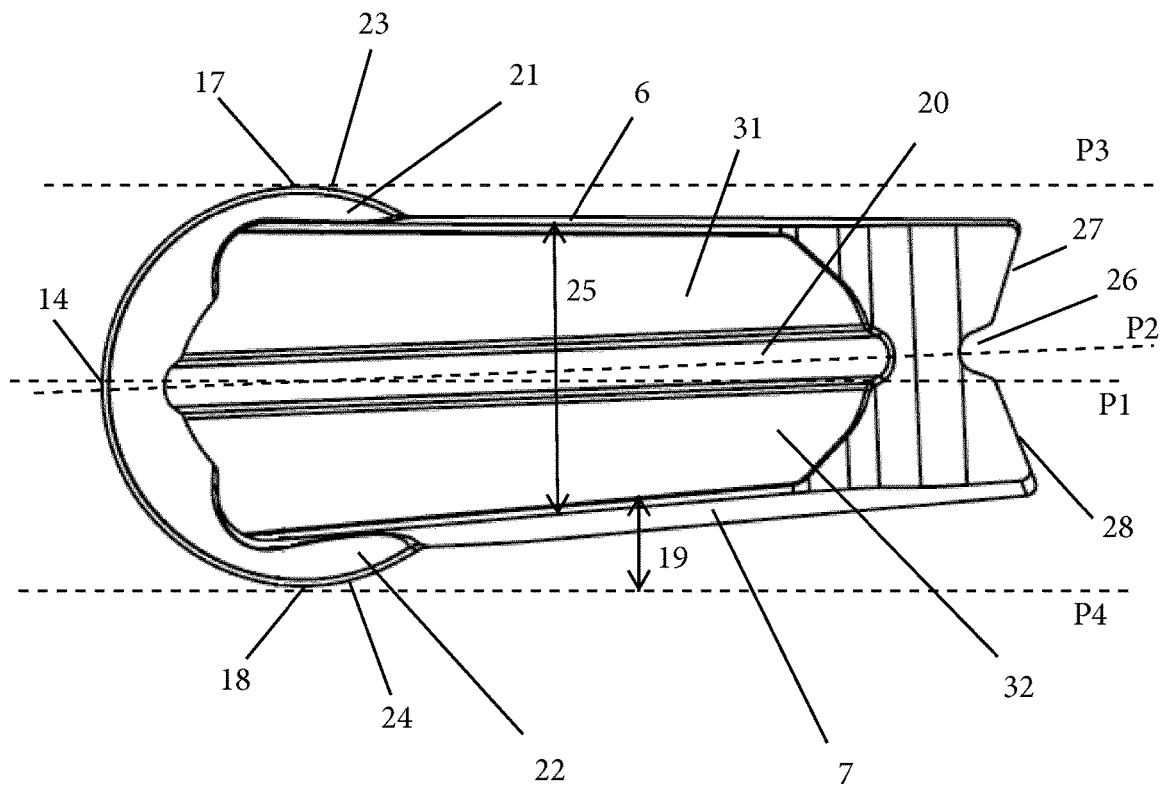
FIG. 28 is a bottom view of the grooving insert in FIG. 24.

The cutting edge 8 of the second grooving insert 1 is shaped as, or extends along, a circular arc, which is best seen in FIG. 27. More specifically, the cutting edge is shaped as a major arc, which subtends an angle greater than 180° but less than 360°. The angle for the second grooving insert 1 is 190°-250°.

In other words, the angle between the first end point 12 and the second end point 13 is 190°-250°.

The cutting edge 8 of the second grooving insert 1 is completely located in the reference plane P5, which is perpendicular to the first plane P1.

The first and second distal edge portions 17, 18 of the second grooving insert 1 is located relatively closer to the rear surface 5, compared to the first and second distal edge portions of the first grooving insert.

The first and second clearance surfaces 21, 22 of the second grooving insert 1 has upper portions, adjacent to the cutting edge 8 which corresponds to the circular arc shape of the cutting edge.

As for the first grooving insert, the first side surface 6 comprises a first clearance surface 21 adjacent to a first portion 23 of the cutting edge 8 forming a first clearance angle γ in relation to the third plane P3. Likewise, the second side surface 7 comprises a second clearance surface 22 adjacent to a second portion 24 of the cutting edge 8. The second clearance surface 22 forms a second clearance angle δ in relation to the third plane P3. The second clearance angle δ is larger than the first clearance angle γ. Each of the first and second clearance surfaces 21, 22 and the bottom surface 3 are spaced apart.

Figure 29:
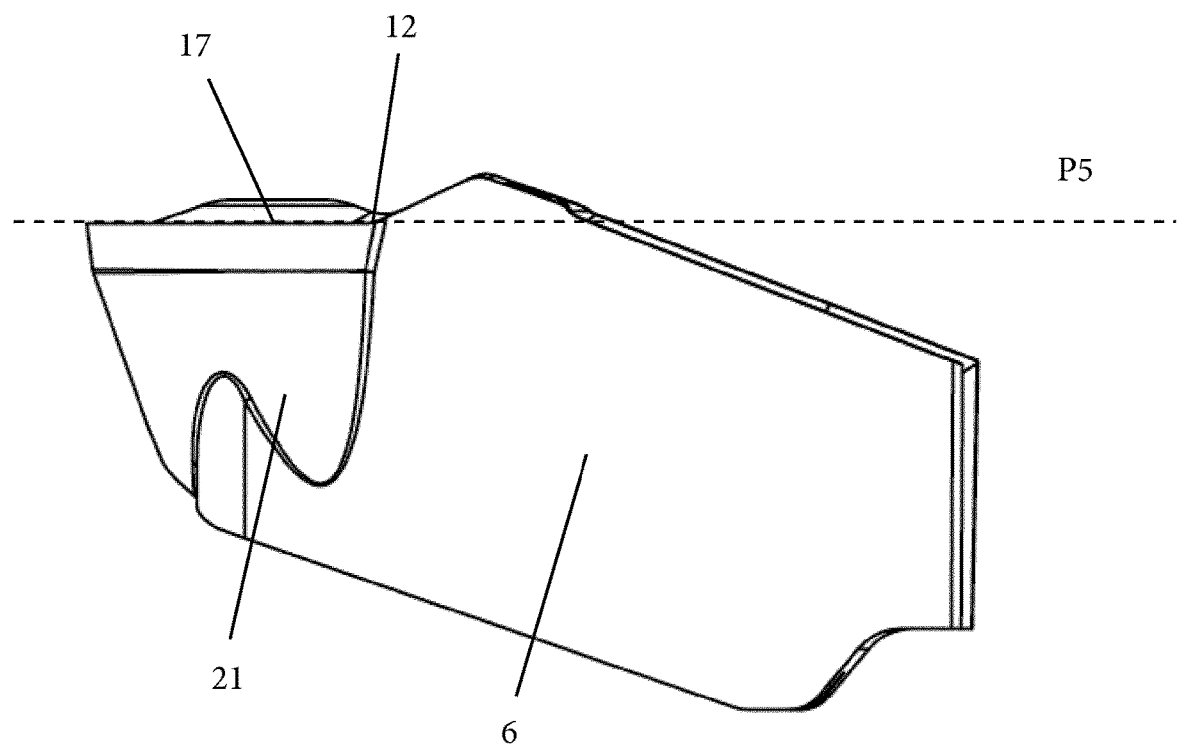
FIG. 29 is a first side view of the grooving insert in FIG. 24.
Figure 30:
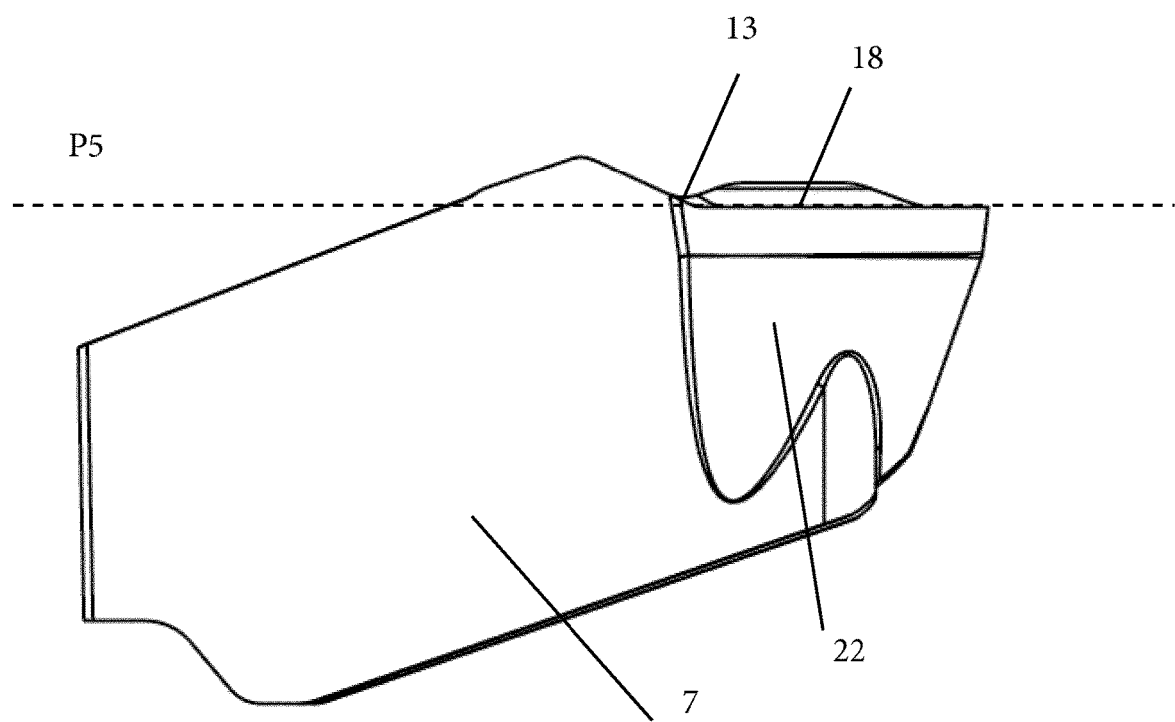
FIG. 30 is a second side view of the grooving insert in FIG. 24.

An area of the second clearance surface 22 is greater than an area of the first clearance surface 21, as seen in FIGS. 29-30.

Regardless of it is the grooving insert 1 according to a first embodiment or if it is the grooving insert 1 according to a second embodiment which is mounted or positioned in the insert seat 63 of the face grooving tool body 51, the top support surface 15, 16 of the grooving insert 1 is in contact with the upper clamping surface 64, the bottom support surface 31, 32 of the grooving insert 1 is in contact with the lower support surface 65, and the rear support surface 27, 28 of the grooving insert 1 is in contact with the insert seat 63 rear support surface 76. In a corresponding manner, the first side surface 55 of the blade portion 52 is adjacent to the first side surface 6 of the grooving insert 1, and the second side surface 56 of the blade portion 52 is adjacent to the second side surface 7 of the grooving insert 1. Formulated differently, the first side surface 55 of the blade portion 52 and the first side surface 6 of the grooving insert 1 are facing the same direction, and the second side surface 56 of the blade portion 52 and the second side surface 7 of the grooving insert 1 are both facing an opposite direction.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such. Terms such as "upper", "lower", "top", "bottom", "forward" and "rear" refer to features as shown in the current drawings and as perceived by the skilled person.

The invention claimed is:

1. A grooving insert comprising:
a front surface and an opposite rear surface;
a first side surface and an opposite second side surface; and
a top surface and an opposite bottom surface, the top surface including a top front portion and a top rear portion, the top front portion having a rake face and a cutting edge, the cutting edge being at least partly formed in an intersection between the rake face and the front surface, the cutting edge extending continuously or substantially continuously between a first end point and a second end point, the cutting edge being arranged symmetrically or substantially symmetrically relative to a first plane, wherein the first plane intersects a mid-point of the cutting edge and intersects the rear surface, the top rear portion having a top support surface and the bottom surface having a bottom support surface, wherein the bottom surface is symmetrically or substantially symmetrically arranged in relation to a second plane, the second plane intersecting the front surface and the rear surface, and wherein the first plane and the second plane form an angle of 0.5-5.0° relative to each other in a top view.

2. The grooving insert according to claim 1, wherein a distance from the bottom surface to a reference plane, is increasing away from the front surface towards the rear surface, where at least 50% of the cutting edge, the first end point and the second end point are located in the reference plane, and wherein the reference plane is perpendicular to the first plane.

3. The grooving insert according to claim 1, wherein the cutting edge includes a first distal edge portion adjacent to the first side surface, and a second distal edge portion adjacent to the second side surface, wherein the first and second distal edge portions are the most distal portions of the cutting edge in relation to the first plane, wherein a third plane, parallel to the first plane, intersects the first distal edge portion, wherein a fourth plane, parallel to the first plane, intersects the second distal edge portion, and wherein a distance from the fourth plane to the bottom support surface increases towards the rear surface.

4. The grooving insert according to claim 1, wherein the bottom surface includes a first groove symmetrically arranged in relation to the second plane and extending from the front surface to the rear surface.

5. The grooving insert according to claim 1, wherein the first side surface includes a first clearance surface adjacent to a first portion of the cutting edge, wherein the first clearance surface forms a first clearance angle in relation to the third plane, wherein the second side surface includes a second clearance surface adjacent to a second portion of the cutting edge, wherein the second clearance surface forms a second clearance angle in relation to the third plane, the second clearance angle being larger than the first clearance angle.

6. The grooving insert according to claim 1, wherein the first side surface includes a first clearance surface adjacent to a first portion of the cutting edge and the second side surface includes a second clearance surface adjacent to a second portion of the cutting edge, and wherein lower boundary lines of each of the first and second clearance surfaces and the bottom surface are spaced apart, an area of the second clearance surface being greater than an area of the first clearance surface.

7. The grooving insert according to claim 1, wherein a width of the bottom surface that is perpendicular to the second plane, decreases away from the front surface.

8. The grooving insert according to claim 1, wherein the rear surface includes a first rear support surface adjacent to the first side surface and a second rear support surface adjacent to the second side surface, and a second groove extending from the top surface towards the bottom surface and extending between the first rear support surface and the second rear support surface.

9. The grooving insert according to claim 1, wherein the grooving insert has exactly one cutting edge.

10. The grooving insert according to claim 1, wherein the top rear portion includes a central structure symmetrically or substantially symmetrically arranged in relation to a sixth plane, wherein the sixth plane intersects the front surface and the rear surface, wherein the first plane and the sixth plane form an angle of 0.5-5.0° relative to each other, wherein the angle between the first and sixth planes and angle between the first plane and second planes are equally large, wherein the second plane and the sixth plane are parallel and spaced apart, and wherein a distance from the second side surface to the sixth plane is shorter than a distance from the second side surface to the second plane.

11. The grooving insert according to claim 10, wherein a central structure of the top rear portion is a third groove, wherein the third groove is spaced apart in relation to each of the first and second side surfaces, wherein the sixth plane intersects the cutting edge at an intersection point which is spaced apart from the mid-point of the cutting edge, and wherein a distance from the second side surface to the intersection point is shorter than a distance from the second side surface to the mid-point of the cutting edge.

12. The grooving insert according to claim 1, wherein the top front portion is wider than the top rear portion, where the widths are measured perpendicular to the second plane.

13. The grooving insert according to claim 1, wherein the top support surface includes a first top support surface adjacent to the first side surface, and a second top support surface adjacent to the second side surface, wherein the third groove extends between the first and second top support surfaces, wherein the bottom support surface includes a first bottom support surface adjacent to the first side surface, and a second bottom support surface adjacent to the second side surface, wherein the first groove extends between the first and second bottom support surfaces, and wherein a width of the second top support surface increases towards the rear surface, the width of the second top support surface being measured in a plane perpendicular to the first plane.

14. The grooving insert according to claim 13, wherein a width of each of the first top support surface, the first bottom support surface, and the second bottom support surface decreases towards the rear surface, where the widths are measured in planes perpendicular to the first plane.

15. A grooving tool comprising:
a grooving insert according to claim 1; and
a face grooving tool body, the face grooving tool body having a blade portion, the blade portion including a top surface, an opposite bottom surface, a first side surface and an opposite second side surface, a front end and an opposite rear end, a longitudinal axis of the blade portion coinciding with a primary cutting feed direction of the blade portion, an insert seat in which the grooving insert is seated, wherein the insert seat opens in the front end, the insert seat including an upper clamping surface formed in the upper blade portion in contact with the top support surface, the bottom surface including a bottom support surface, an opposite lower support surface formed in the lower blade portion in contact with the bottom support surface, and a rear support surface in contact with the rear surface, wherein a lower support surface central axis forms an angle 1-45° relative to the longitudinal axis in a side view such that the lower support surface central axis and the longitudinal axis in a side view intersect forward of the front end, the first side surface being curved around a first side surface axis of curvature, wherein the first side surface axis of curvature is parallel to the longitudinal axis, the second side surface being curved around the second side surface axis of curvature, wherein the first side surface of the blade portion and the first side surface of the grooving insert faces the first and second side surface axes of curvature, and wherein the second plane intersects the first side surface axis of curvature rearwards of the front surface of the grooving insert.

\* \* \* \* \*